US011008437B2

(12) United States Patent
Watanabe et al.

(10) Patent No.: US 11,008,437 B2
(45) Date of Patent: May 18, 2021

(54) MATERIAL SET FOR FORMING THREE-DIMENSIONAL OBJECT, THREE-DIMENSIONAL OBJECT PRODUCING METHOD, AND THREE-DIMENSIONAL OBJECT PRODUCING APPARATUS

(71) Applicants: Masaki Watanabe, Kanagawa (JP); Takuya Saito, Kanagawa (JP); Yoichi Sakurai, Kanagawa (JP); Tatsuya Niimi, Kanagawa (JP)

(72) Inventors: Masaki Watanabe, Kanagawa (JP); Takuya Saito, Kanagawa (JP); Yoichi Sakurai, Kanagawa (JP); Tatsuya Niimi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 336 days.

(21) Appl. No.: 15/955,139

(22) Filed: Apr. 17, 2018

(65) Prior Publication Data

US 2018/0237610 A1 Aug. 23, 2018

Related U.S. Application Data

(63) Continuation of application No. PCT/JP2016/081007, filed on Oct. 19, 2016.

(30) Foreign Application Priority Data

Nov. 13, 2015 (JP) ............................ JP2015-223321
May 18, 2016 (JP) ............................ JP2016-099911
Sep. 16, 2016 (JP) ............................ JP2016-181975

(51) Int. Cl.
*C08K 3/22* (2006.01)
*B33Y 70/00* (2020.01)
(Continued)

(52) U.S. Cl.
CPC ............ *C08K 3/22* (2013.01); *A61C 13/0019* (2013.01); *A61C 13/08* (2013.01); *B29C 64/112* (2017.08);
(Continued)

(58) Field of Classification Search
None
See application file for complete search history.

(56) References Cited

U.S. PATENT DOCUMENTS 5,204,055 A 4/1993 Sachs et al.
5,697,043 A 12/1997 Baskaran et al.
(Continued)

FOREIGN PATENT DOCUMENTS

EP 3 115 183 A1 1/2017
EP 3 216 598 A1 9/2017
(Continued)

OTHER PUBLICATIONS

Machine translation of Detailed Description of JP 2009-298146 A, retrieved from ESPACENET on Oct. 7, 2020. (Year: 2009).*
(Continued)

*Primary Examiner* — Fred M Teskin
(74) *Attorney, Agent, or Firm* — Oblon, McClelland, Maier & Neustadt, L.L.P.

(57) ABSTRACT

Provided is a material set for forming a three-dimensional object, the material set including: a first liquid material for forming a three-dimensional object; and a second liquid material for forming a three-dimensional object, wherein the first liquid material contains a solvent, an organic compound A, and inorganic particles, and wherein the second liquid material contains an organic compound B having reactivity with the organic compound A.

19 Claims, 2 Drawing Sheets

(51) Int. Cl.
  *B33Y 10/00* (2015.01)
  *B33Y 30/00* (2015.01)
  *B29C 64/135* (2017.01)
  *B29C 67/00* (2017.01)
  *A61C 13/00* (2006.01)
  *A61C 13/08* (2006.01)
  *B33Y 80/00* (2015.01)
  *C08K 3/08* (2006.01)
  *C08K 3/34* (2006.01)
  *C08L 33/02* (2006.01)
  *C08L 39/06* (2006.01)
  *C08L 75/04* (2006.01)
  *C08L 79/02* (2006.01)
  *B29C 64/112* (2017.01)
  *B29K 33/04* (2006.01)
  *B29K 509/02* (2006.01)

(52) U.S. Cl.
  CPC ............ *B29C 64/135* (2017.08); *B29C 67/00* (2013.01); *B33Y 10/00* (2014.12); *B33Y 30/00* (2014.12); *B33Y 70/00* (2014.12); *B33Y 80/00* (2014.12); *C08K 3/08* (2013.01); *C08K 3/34* (2013.01); *C08L 33/02* (2013.01); *C08L 39/06* (2013.01); *C08L 75/04* (2013.01); *C08L 79/02* (2013.01); *A61C 13/0013* (2013.01); *B29K 2033/04* (2013.01); *B29K 2039/06* (2013.01); *B29K 2509/02* (2013.01); *C08K 2003/0881* (2013.01); *C08K 2003/2244* (2013.01); *C08K 2201/003* (2013.01)

(56) References Cited

U.S. PATENT DOCUMENTS

| | | |
|---|---|---|
| 6,790,403 B1 | 9/2004 | Priedeman, Jr. et al. |
| 6,921,500 B1 | 7/2005 | Feenstra |
| 6,955,776 B1 | 10/2005 | Feenstra |
| 8,513,376 B2 * | 8/2013 | Raymond .............. C08G 59/44  528/340 |
| 2001/0030383 A1 | 10/2001 | Swanson et al. |
| 2001/0038168 A1 | 11/2001 | Popa et al. |
| 2001/0050031 A1 | 12/2001 | Bredt et al. |
| 2002/0017743 A1 | 2/2002 | Priedeman, Jr. |
| 2003/0004600 A1 | 1/2003 | Priedeman, Jr. |
| 2003/0011103 A1 | 1/2003 | Swanson et al. |
| 2004/0026807 A1 | 2/2004 | Andersson et al. |
| 2004/0126452 A1 | 7/2004 | Swanson et al. |
| 2004/0129823 A1 | 7/2004 | Swanson et al. |
| 2004/0207123 A1 | 10/2004 | Patel et al. |
| 2004/0217517 A1 | 11/2004 | Swanson et al. |
| 2005/0004282 A1 | 1/2005 | Priedeman, Jr. et al. |
| 2006/0208388 A1 | 9/2006 | Bredt et al. |
| 2008/0071030 A1 | 3/2008 | Priedeman, Jr. |
| 2010/0270707 A1 | 10/2010 | Priedeman, Jr. et al. |
| 2011/0042859 A1 | 2/2011 | Patel et al. |
| 2014/0131908 A1 | 5/2014 | Sun et al. |
| 2014/0227123 A1 | 8/2014 | Günster et al. |
| 2015/0259247 A1 | 9/2015 | Watanabe |
| 2016/0038633 A1 | 2/2016 | Watanabe |
| 2017/0008228 A1 | 1/2017 | Iwata et al. |
| 2017/0258556 A1 | 9/2017 | Watanabe et al. |
| 2017/0326645 A1 | 11/2017 | Saito et al. |

FOREIGN PATENT DOCUMENTS

| | | | |
|---|---|---|---|
| EP | 3 243 500 A1 | 11/2017 | |
| JP | 06-218712 | 8/1994 | |
| JP | 2003-507121 | 2/2003 | |
| JP | 2003-515465 | 5/2003 | |
| JP | 2003-531034 | 10/2003 | |
| JP | 2003-531220 | 10/2003 | |
| JP | 2008-507619 | 3/2008 | |
| JP | 2009-255479 | 11/2009 | |
| JP | 2009298146 A * | 12/2009 | ............ B29C 67/00 |
| JP | 2011-021218 | 2/2011 | |
| JP | 2012-097215 | 5/2012 | |
| JP | 2014-522331 | 9/2014 | |
| JP | 2016-172333 | 9/2016 | |
| TW | 577795 B | 3/2004 | |
| WO | WO 97/44291 A1 | 11/1997 | |
| WO | WO 02/064353 A1 | 8/2002 | |
| WO | WO 2009/139395 A1 | 11/2009 | |
| WO | WO 2014/078537 A1 | 5/2014 | |

OTHER PUBLICATIONS

Vestamin, Curing agents for epoxy resin systems, Product Brochure, five pages (Undated).*
Namavar, et al, "Why is Titanium Biocompatible?" Poster No. 0981, ORS 2012 Annual Meeting. (Year: 2012).*
Combined Chinese Office Action and Search Report dated Mar. 3, 2020 in corresponding Chinese Patent Application No. 201680063040.8 (with English Translation) citing document AO therein, 24 pages.
Extended European Search Report dated Nov. 28, 2018 in European Patent Application No. 16863971.4 citing documents AA-AF and AO-AS therein, 8 pages.
International Search Report dated Nov. 22, 2016 for counterpart International Patent Application No. PCT/JP2016/081007 filed Oct. 19, 2016 (with English Translation).
Written Opinion dated Nov. 22, 2016 for counterpart International Patent Application No. PCT/JP2016/081007 filed Oct. 19, 2016.

* cited by examiner

MATERIAL SET FOR FORMING THREE-DIMENSIONAL OBJECT, THREE-DIMENSIONAL OBJECT PRODUCING METHOD, AND THREE-DIMENSIONAL OBJECT PRODUCING APPARATUS

CROSS-REFERENCE TO RELATED APPLICATIONS

The present application is a continuation application of International Application No. PCT/JP2016/081007, filed Oct. 19, 2016, which claims priority to Japanese Patent Application No. 2015-223321, filed Nov. 13, 2015, Japanese Patent Application No. 2016-099911, filed May 18, 2016, and Japanese Patent Application No. 2016-181975, filed Sep. 16, 2016. The contents of these applications are incorporated herein by reference in their entirety.

BACKGROUND OF THE INVENTION

Field of the Invention

The present disclosure relates to a material set for forming a three-dimensional object, a three-dimensional object producing method, and a three-dimensional object producing apparatus.

Description of the Related Art

Hitherto, prostheses for teeth (artificial teeth) used have been formed of metal materials such as cobalt-chromium alloys, ceramic materials such as zirconia, and organic materials such as hybrid resins combined with fillers. Artificial teeth work in place of a dysfunctional occlusal function. Many of the materials for artificial teeth not only undergo temporal changes such as wear and corrosion, but also have aesthetic problems such as stronger whiteness than natural teeth. For example, zirconia has been known as a material expected to overcome this problem. Zirconia has transparency and, with addition of a color gradation, can form artificial teeth that do not look different when placed beside natural teeth. In order to be handled as prostheses, zirconia needs processing to be formed into desired shapes. However, zirconia, which is an extremely hard material, not only takes a lot of time to be processed, but also cannot be finely processed in a manner to include an internal structure, particularly in the case of cutting by CAD/CAM.

Meanwhile, powder laminated object manufacturing is expected to enable fine processing intended for inclusion of an internal structure, and methods using lasers and electron beams have been proposed (see, for example, Japanese Translation of PCT International Application Publication No. 2003-531034 and Japanese Unexamined Patent Application Publication No. 2011-21218).

There has also been proposed a component producing method of adding a binder material in an ink and then making the ink land on a powder component by an inkjet method to allow the materials to undergo a chemical reaction to obtain a three-dimensional shape (see, for example, Japanese Unexamined Patent Application Publication No. 06-218712).

There has also been proposed a compact producing method of adding a binder component in an ink and then making the ink land on powder particles to bind the particles (see, for example, Japanese Translation of PCT International Application Publication No. 2014-522331).

SUMMARY OF THE INVENTION

According to one aspect of the present disclosure, a material set for forming a three-dimensional object includes a first liquid material for forming a three-dimensional object and a second liquid material for forming a three-dimensional object. The first liquid material contains a solvent, an organic compound A, and inorganic particles. The second liquid material contains an organic compound B having reactivity with the organic compound A.

DESCRIPTION OF THE EMBODIMENTS

Figure 1:
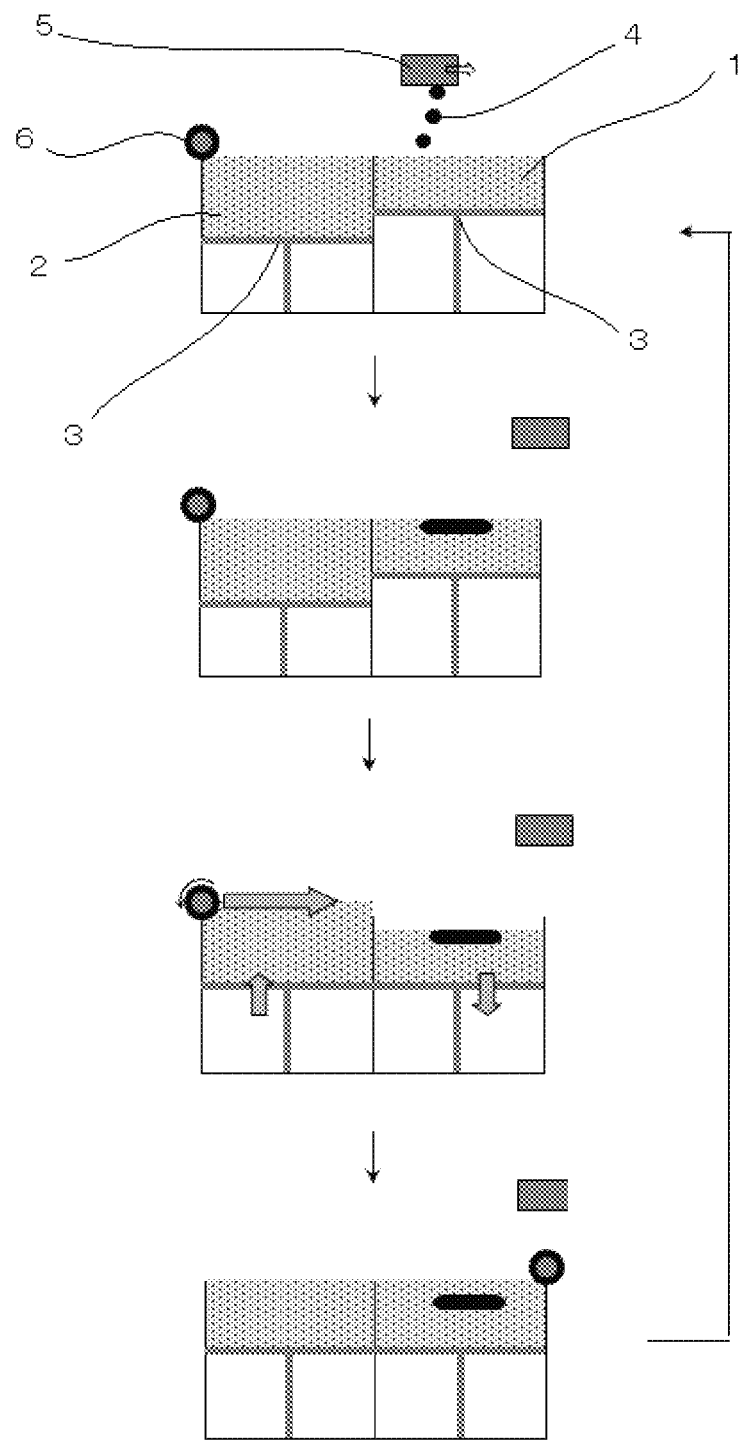
FIG. 1 is a schematic diagram illustrating an example of a three-dimensional object producing apparatus of the present disclosure.

The present disclosure has an object to provide a material set for forming a three-dimensional object capable of producing a three-dimensional object that is formed of a material having a high melting point and a high hardness and has a complicated three-dimensional shape easily, efficiently, and with a high strength.

The present disclosure can provide a material set for forming a three-dimensional object capable of producing a three-dimensional object that is formed of a material having a high melting point and a high hardness and has a complicated three-dimensional shape easily, efficiently, and with a high strength.

(Material Set for Forming Three-Dimensional Object)

A material set for forming a three-dimensional object (may also be referred to as "material set for laminated object manufacturing") of the present disclosure includes a first liquid material for forming a three-dimensional object (may also be referred to as "first liquid material for laminated object manufacturing" or "slurry"), and a second liquid material for forming a three-dimensional object (may also be referred to as "second liquid material for laminated object manufacturing"). The first liquid material contains a solvent, an organic compound A, and inorganic particles. The second liquid material contains an organic compound B having reactivity with the organic compound A. The material set preferably includes a third liquid material for forming a three-dimensional object (may also be referred to as "third liquid material for laminated object manufacturing") capable of dissolving the organic compound A. The material set further includes other materials as needed.

The material set for forming a three-dimensional object of the present disclosure is based on a finding that existing methods using lasers and electron beams need conveying of powders, but ceramic materials that need sintering, such as zirconia, may have a considerably poor fluidity and become unable to be conveyed when the materials are made small in particle diameter in order to be ensured sinterability.

Further, existing methods using lasers and electron beams cannot add gradations to artificial teeth. Meanwhile, inkjet methods can add gradations during object formation by adding a colorant in the second liquid material for forming a three-dimensional object, allowing expectations for higher value addition.

The material set for forming a three-dimensional object of the present disclosure is also based on a finding that existing component producing methods not only take certain periods of time from when inks land until when reactions end but also cannot obtain sufficient binding strengths, because components for actively causing cross-linking are contained only in inks, leading to a problem that green bodies having high strengths and high precisions cannot be obtained rapidly.

The material set for forming a three-dimensional object of the present disclosure is also based on the following finding. Existing compact producing methods bind particles to each other with binders. Therefore, not only can sufficient binding effects not be obtained unless the binders dry, but sufficient binding strengths cannot be obtained because only the binders have dried and solidified. This leads to a problem that green bodies having high strengths and high precisions cannot be obtained rapidly.

Meanwhile, the first liquid material for forming a three-dimensional object becomes a dry solid body formed of the organic compound A and the inorganic particles through volatilization of the solvent, and particularly becomes a hard, strong dry solid body when the organic compound A exhibits a function as a binder. Hence, even when the organic compound B contained in the second liquid material for forming a three-dimensional object reacts with the organic compound A and hardens (to make a region A), there exists around the dry, solid unreacted region (referred to as a region B) to which the second liquid material for forming a three-dimensional object is not applied. Therefore, the strength difference between the region A and the region B is small, to make it difficult to take out only the region A that is needed finally.

However, because the region B contains the organic compound A in an unreacted state, application of a material that forms a salt with the organic compound A to the entire region enables only the region B to solubilize and undergo shape collapse while the shape of the region A is retained. The liquid material that solubilizes the organic compound A, i.e., the liquid material that collapses only the region B is the third liquid material for forming a three-dimensional object.

<First Liquid Material for Forming Three-Dimensional Object (First Liquid Material for Laminated Object Manufacturing)>

The first liquid material for forming a three-dimensional object (first liquid material for laminated object manufacturing) contains a solvent, an organic compound A, and inorganic particles, and further contains other components as needed.

<<Inorganic Particles>>

The inorganic particles are not particularly limited and may be appropriately selected depending on the intended purpose. Examples of the inorganic particles include ceramic particles and metal particles.

It is preferable that the inorganic particles have biocompatibility.

<<<Ceramic Particles>>>

The ceramic particles are not particularly limited and may be appropriately selected depending on the intended purpose. Examples of the ceramic particles include zirconia particles, alumina particles, silica particles, and lithium disilicate particles. One of these kinds of ceramic particles may be used alone or two or more of these kinds of ceramic particles may be used in combination. Among these kinds of ceramic particles, zirconia particles are preferable. When zirconia particles are used as the ceramic particles, the zirconia particles may contain, for example, yttria or ceria as a stabilizer.

The volume average particle diameter of the ceramic particles is preferably less than 5 micrometers and more preferably less than 1 micrometer in the first liquid material for forming a three-dimensional object. When the volume average particle diameter of the ceramic particles is less than 5 micrometers, a green sheet or a green body can be prevented from being a low density and can be sintered favorably to have an improved mechanical strength. Without any limitation, any appropriate known particle diameter measuring instrument, for example, MULTISIZER III (available from Coulter Counter) or FPIA-3000 (available from Sysmex Corporation) may be selected depending on the intended purpose and used for measuring the volume average particle diameter of the ceramic particles according to a known method. The green sheet or the green body is a sheet or a compact obtained by injection molding of a compound, which is a product obtained by kneading a slurry and a binder.

Because of an extremely high melting point, the zirconia particles cannot be sintered unless the volume average particle diameter of the zirconia particles is small. An ideal volume average particle diameter is on the order of some tens of nanometers. Therefore, when the volume average particle diameter of the zirconia particles is 1 micrometer or greater, there will remain much space between the particles, to make it difficult to sinter the particles. In a typical process of laminated object manufacturing, there is a need for conveying a material containing the zirconia particles from a supplying tank to a forming tank. If the size of the particles constituting the material is small, there occurs a strong interparticle force, which tends to significantly degrade fluidity. Therefore, in order to improve fluidity while maintaining sinterability, there is a need for forming a slurry of the material and enabling handling of the slurry while maintaining the volume average particle diameter to the order of some hundreds of nanometers.

The content of the stabilizer (for example, yttria or ceria) in the zirconia particles is preferably 2% by mass or greater but 6% by mass or less and more preferably 3% by mass or greater but 5% by mass or less of the total amount of the first liquid material for forming a three-dimensional object. When the content of the stabilizer is 2% by mass or greater but 6% by mass or less, the function as the stabilizer works sufficiently, to make cracking less likely to occur during firing.

The content of the stabilizer in the zirconia particles can be measured by, for example, an ICP emission spectrophotometric method.

The monoclinic rate of the zirconia particles is preferably 30% or lower and more preferably 20% or lower. When the monoclinic rate of the zirconia particles is 30% or lower, the tetragonal rate is appropriate and a mechanical strength is favorable. The monoclinic rate of the inorganic particles can be measured with, for example, an X-ray powder diffractometer under predetermined conditions.

The method for producing the ceramic particles is not particularly limited and may be appropriately selected depending on the intended purpose. Examples of the method include a pyrolysis method, a coprecipitation method, and a hydrolysis method. Among these methods, a pyrolysis method and a coprecipitation method are preferable for zirconia particles.

Examples of the pyrolysis method include a method of mixing predetermined amounts of zirconium oxychloride and an yttrium chloride aqueous solution, and adding and mixing with the resultant, sodium chloride (or potassium chloride) in an amount of 0.1% by mass or greater but 1% by mass or less of the total amount of zirconium oxychloride. The mixture liquid is subjected to instantaneous drying by, for example, a spray drying method, to obtain a dry powder.

The instantaneous drying is a method that can dry the target within 10 seconds. It is preferable to perform drying at a drying temperature of 200 degrees C. or higher in heated air. Next, the dry powder is pyrolyzed in the air at a temperature of 800 degrees C. or higher but 1,200 degrees C. or lower, to obtain an oxide calcined powder. The oxide calcined powder is pulverized by a wet grinding method to a pulverization diameter of 2 micrometers or less, and washed with water.

The method for washing with water is not particularly limited and may be appropriately selected depending on the intended purpose. A continuous washing filtration method using a membrane filter is preferable. Washing with water is performed sufficiently in a manner that by washing with water, the sodium (or potassium) concentration in the inorganic particles falls within a range of 10 ppm or greater but 100 ppm or less as an oxide equivalent amount. The slurry obtained from washing with water is dried, to obtain inorganic particles (zirconia powder).

Examples of the coprecipitation method include a method of mixing zirconium oxychloride and an yttrium chloride aqueous solution. Here, particularly, in order to form a metal complex in a manner to make hydrates of zirconium oxychloride and yttrium chloride precipitate at the same pH, sodium sulfate (or potassium sulfate) is added at a ratio by mole of 0.3 or greater but 0.7 or less relative to zirconia and is allowed to undergo a reaction at a temperature of 50 degrees C. or higher but 100 degrees C. or lower for some hours or longer. To this mixture liquid, an alkali aqueous solution of, for example, sodium hydroxide or ammonia is added under stirring, to adjust pH of the aqueous solution to 8 or higher but 10 or lower. The obtained particles of the coprecipitated hydrates are sufficiently washed with water, and it is confirmed that sodium (or potassium) is in the range of 10 ppm or greater but 100 ppm or less as an oxide equivalent. The particles of the hydrates after washed with water are dehydrated and dried, and fired in the air at a temperature of 800 degrees C. or higher but 1,200 degrees C. or lower, to obtain an oxide calcined powder. The obtained oxide calcined powder is pulverized by a wet method to 2 micrometers or less and dried, to obtain inorganic particles (zirconia powder).

<<<Metal Particles>>>

The metal particles may be appropriately selected depending on the intended purpose. Examples of the metal particles include titanium particles, titanium alloy particles, cobalt/chromium alloy particles, and stainless steel alloy particles. One of these kinds of metal particles may be used alone or two or more of these kinds of metal particles may be used in combination. Among these kinds of metal particles, titanium particles, and titanium alloy particles are preferable.

The volume average particle diameter of the metal particles is preferably less than 50 micrometers and more preferably less than 10 micrometers. When the volume average particle diameter of the metal particles is less than 50 micrometers, the interparticle space can be reduced, and the density of a green sheet or a green body can be increased. This makes it possible to suppress firing shrinkage during sintering and improve dimensional precision. Without any limitation, any appropriate known particle diameter measuring instrument, for example, MULTISIZER III (available from Coulter Counter) or FPIA-3000 (available from Sysmex Corporation) may be selected depending on the intended purpose and used for measuring the volume average particle diameter of the metal particles according to a known method.

The content of the inorganic particles is preferably 20 parts by mass or greater but 70 parts by mass or less relative to 100 parts by mass of the first liquid material for forming a three-dimensional object (slurry). When the content of the inorganic particles is 20 parts by mass or greater, the amount of the solvent having volatility can be reduced relatively, and the density of a green sheet or a green body can be increased. When the content of the inorganic particles is 70 parts by mass or less, the fluidity of the slurry can be improved, and conveying of the slurry by, for example, a doctor blade can be performed favorably.

<<Organic Compound A>>

The organic compound A is not particularly limited and may be appropriately selected depending on the intended purpose. Examples of the organic compound A include a water-soluble resin. Water-solubility of the water-soluble resin means that the resin dissolves in water in an amount of 10% by mass or greater at room temperature (25 degrees C.).

It is preferable that the organic compound A contain an acidic functional group having reactivity with a basic functional group.

Examples of the acidic functional group include a carboxyl group and a hydroxyl group.

Examples of the organic compound A containing an acidic functional group include modified polyvinyl alcohols and polyacrylic acid. One of these organic compounds may be used alone or two or more of these organic compounds may be used in combination. Among these organic compounds, polyacrylic acid is preferable because polyacrylic acid has a high reactivity with a basic functional group.

The weight average molecular weight (Mw) of the polyacrylic acid is preferably 400,000 or greater, more preferably 400,000 or greater but 1,000,000 or less, and particularly preferably 600,000 or greater but 800,000 or less. When the weight average molecular weight (Mw) of the polyacrylic acid is 400,000 or greater, the polyacrylic acid can easily form a cross-linked structure with the organic compound B containing a basic functional group in the second liquid material for forming a three-dimensional object, and a hardening time for hardening a three-dimensional object will be appropriate. On the other hand, when the weight average molecular weight (Mw) of the polyacrylic acid is 1,000,000 or less, the slurry viscosity will be appropriate, and the inorganic particles tend not to have variation in the slurry to be obtained. The weight average molecular weight (Mw) of the polyacrylic acid can be calculated based on a molecular weight distribution of the polyacrylic acid isolated by, for example, a gel permeation chromatography (GPC) method.

The content of the organic compound A is preferably 5 parts by mass or greater but 110 parts by mass or less relative to 100 parts by mass of the inorganic particles. When the content of the organic compound A is 5 parts by mass or greater, a sufficient binding effect can be obtained, and the inorganic particles have a good dispersion state and a better dispersion stability in the slurry. On the other hand, when the content of the organic compound A is 110 parts by mass or less, the slurry viscosity can be low, and conveying of the slurry by, for example, a doctor blade can be performed favorably. Without any limitation, any appropriate known thermal analyzer, for example, DSC-200 (available from Seiko Instruments Inc.) may be selected depending on the intended purpose and used for measuring the content of the organic compound A according to a known method.

<<Solvent>>

The solvent is not particularly limited and may be appropriately selected depending on the intended purpose so long as the solvent can dissolve the organic compound A. Examples of the solvent include polar solvents such as water, methanol, ethanol, and toluene (with a boiling point of 110.6 degrees C.). One of these solvents may be used alone or two or more of these solvents may be used in combination. Among these solvents, an organic solvent having a low boiling point is preferable, and an organic solvent having a boiling point of 80 degrees C. or lower is more preferable in order to improve productivity of forming a green sheet or a green body.

Examples of the organic solvent having a boiling point of 80 degrees C. or lower include ethanol (with a boiling point of 78.37 degrees C.), methanol (with a boiling point of 64.7 degrees C.), ethyl acetate (with a boiling point of 77.1 degrees C.), acetone (with a boiling point of 56 degrees C.), and methylene chloride (with a boiling point of 39.6 degrees C.).

As the solvent, a polyvalent alcohol containing 6 or less carbon atoms is suitable for use. With a polyvalent alcohol containing 6 or less carbon atoms, no adherent matter attaches to the members configured to form layers, and layer driability is excellent.

<<<Polyvalent Alcohol>>>

The polyvalent alcohol is not particularly limited and may be appropriately selected depending on the intended purpose so long as the number of carbon atoms is 6 or less. For example, diols, triols, or tetraols that are liquid at normal temperature may be added to the first liquid material for forming a three-dimensional object, or triols, tetraols, or polysaccharides that are solid may be previously dispersed in a solvent that can dissolve these substances and then added to the first liquid material for forming a three-dimensional object.

Examples of the polyvalent alcohols include glycols such as ethylene glycol, diethylene glycol, and propylene glycol; diols such as 1,2-propanediol, 1,3-propanediol, 2,2-dimethyl-1,3-propanediol, 1,3-butanediol, 1,4-butanediol, 1,5-pentanediol, 1,2-hexanediol, 1,6-hexanediol, diethylene glycol, 1,2-cyclohexanediol, 1,4-cyclohexanediol, triethylene glycol, and 2,2'-thiodiethanol; triols such as glycerin, 1,2,3-butanetriol, 1,2,4-butanetriol, 1,2,5-pentanetriol, 1,3,5-pentanetriol, 2,3,4-pentanetriol, 1,2,3-hexanetriol, 1,2,6-hexanetriol, and 3-methyl-1,3,5-pentanetriol; tetraols such as butane-1,2,3,4-tetraol (including erythritol), 1,1,5,5-pentanetetraol, 1,2,3,5-pentanetetraol, 1α,2α,3α,4α-cyclopentanetetraol, hexane-1,2,5,6-tetraol, and (3R,4S)-2-oxopenane-1,3,4,5-tetraol; and polysaccharides such as glucose. One of these polyvalent alcohols may be used alone or two or more of these polyvalent alcohols may be used in combination.

The content of the polyvalent alcohol is preferably 0.1 parts by mass or greater but 20 parts by mass or less and more preferably 0.5 parts by mass or greater but 10 parts by mass or less relative to 100 parts by mass of the first liquid material for forming a three-dimensional object (slurry). When the content of the polyvalent alcohol is 0.1 parts by mass or greater, adhesion to a blade can be suppressed. When the content of the polyvalent alcohol is 20 parts by mass or less, the polyvalent alcohol can be prevented from being an incompatible state such as a separated/precipitated state in the slurry, and adhesion to a blade can be suppressed. When the content of the polyvalent alcohol is 0.5 parts by mass or greater but 10 parts by mass or less, an effect of reducing occurrence of adhesion without spoiling removability of the solvent tends to be obtained. When a plurality of polyvalent alcohols are added, the to total amount of all of the polyvalent alcohols is regarded as the amount added.

<<Other Components>>

The other components are not particularly limited and may be appropriately selected depending on the intended purpose. Examples of the other components include a dehydration-condensation agent, a dispersant, a plasticizer, and a sintering aid. Particularly, it is preferable to add a dehydration-condensation agent. It is preferable that the first liquid material for forming a three-dimensional object contain the dispersant, because the inorganic particles have a better dispersibility, are suppressed from settling in a still state, and are made easier to be present in a continuous state during formation of a green sheet or a green body. It is preferable that the first liquid material for forming a three-dimensional object contain the plasticizer, because a green sheet or green body precursor formed of the first liquid material for forming a three-dimensional object is less likely to be cracked when dried. It is preferable that the first liquid material for forming a three-dimensional object contain the sintering aid, because a laminated object obtained can be sintered at a lower temperature in a sintering treatment.

<<<Dehydration-Condensation Agent>>>

It is preferable to add the dehydration-condensation agent to at least any one of the first liquid material for forming a three-dimensional object and the second liquid material for forming a three-dimensional object. Further, when the dehydration-condensation agent is added, it is more preferable to heat a three-dimensional object to be obtained. With addition of the dehydration-condensation agent and heating of the three-dimensional object, covalent bonds can be formed in part of cross-linking formed by an electrostatic interaction between the organic compound A and the organic compound B, resulting in mixed presence of bonds formed by the electrostatic interaction and the covalent bonds in the three-dimensional object. Because of a high affinity with water, the bonds formed by the electrostatic interaction tend to absorb water and swell, to reduce the bend elastic constant and hardness. However, with the covalent bonds, the hardness of the three-dimensional object can be maintained to a certain level or higher. As a result, when taking out the three-dimensional object in a removing step described below, it is possible to take out the three-dimensional object easily without deformation or chipping.

The dehydration-condensation agent means a reaction reagent for synthesizing a carboxylic acid derivative such as an ester-amide bond through an addition-elimination reaction.

The dehydration-condensation agent is not particularly limited and may be appropriately selected depending on the intended purpose. Examples of the dehydration-condensation agent include carbodiimide condensation agents, imidazole condensation agents, triazine condensation agents, phosphonium condensation agents, uronium condensation agents, and halonium condensation agents. One of these dehydration-condensation agents may be used alone or two or more of these dehydration-condensation agents may be used in combination.

Examples of the carbodiimide condensation agents include 1-[3-(dimethylamino)propyl]-3-ethylcarbodiimide, 1-ethyl-3-(3-dimethylaminopropyl)carbodiimide hydrochloride, N,N'-dicyclohexylcarbodiimide (DCC), and N,N'-diisopropyl carbodiimide.

Examples of the imidazole condensation agents include N,N'-carbonyl diimidazole and 1,1'-carbonyl di(1,2,4-triazole).

Examples of the triazine condensation agents include 4-(4,6-dimethoxy-1,3,5-triazin-2-yl)-4-methyl morpholinium=chloride n-hydrate, and (4,6-dimethoxy-1,3,5-triazin-2-yl)-(2-octoxy-2-oxoethyl)dimethyl ammonium trifluoromethane sulfonate.

Examples of the phosphonium condensation agents include 1H-benzotriazol-1-yloxytris(dimethylamino)phosphonium hexafluorophosphate, 1H-benzotriazol-1-yloxytripyrrolidinophosphonium hexafluorophosphate, (7-azabenzotriazol-1-yloxy)tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4(3H)-one.

Examples of the uronium condensation agents include O-(benzotriazol-1-O—N,N,N',N'-tetramethyluronium hexafluorophosphate, O-(7-azabenzotriazol-1-yl)-N,N,N',N'-tetramethyluronium hexafluorophosphate, O—(N-succinimidyl)-N,N,N',N'-tetramethyluronium tetrafluoroborate, O—(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, S-(1-oxide-2-pyrridyl)-N,N,N',N'-tetramethyluronium tetrafluoroborate, O-[2-oxo-1(2H)-pyridyl]-N,N,N',N-tetramethyluronium tetrafluoroborate, and {{[(1-cyano-2-ethoxy-2-oxoethylidene)amino]oxy}-4-morpholinomethylene} dimethylammonium hexafluorophosphate.

Examples of the halonium condensation agents include 2-chloro-1,3-dimethylimidazolinium hexafluorophosphate, 1-(chloro-1-pyrrolidinylmethylene)pyrrolidinium hexafluorophosphate, 2-fluoro-1,3-dimethylimidazolinium hexafluorophosphate, and fluoro-N,N,N',N'-tetramethylformamidinium hexafluorophosphate.

Among these dehydration-condensation agents, 4-(4,6-dimethoxy-1,3,5-triazin-2-yl)-4-methyl morpholinium=chloride n-hydrate (DMT-MM) is preferable as a triazine condensation agent that undergoes a reaction in a polar solvent such as water and alcohols.

The content of the dehydration-condensation agent is preferably 3 parts by mass or greater but 20 parts by mass or less relative to 100 parts by mass of at least any one of the first liquid material for forming a three-dimensional object and the second liquid material for forming a three-dimensional object, in terms of the hardness of a three-dimensional object.

<Second Liquid Material for Forming Three-Dimensional Object (Second Liquid Material for Laminated Object Manufacturing)>

The second liquid material for forming three-dimensional object contains the organic compound B that has reactivity with the organic compound A, and further contains a polyvalent alcohol containing 6 or less carbon atoms, an aqueous medium other than a polyvalent alcohol containing 6 or less carbon atoms, and other components as needed.

The amine value of the second liquid material for forming three-dimensional object is preferably 100 mgKOH/g or greater, more preferably 100 mgKOH/g or greater but 1,000 mgKOH/g or less, yet more preferably 100 mgKOH/g or greater but 500 mgKOH/g or less, and particularly preferably 120 mgKOH/g or greater but 300 mgKOH/g or less. When the amine value is 100 mgKOH/g or greater, a lot of basic moieties are present. Therefore, a cross-linked structure can be easily formed with the organic compound A containing an acidic functional group in the first liquid material for forming a three-dimensional object, and a hardening time for hardening a three-dimensional object will be appropriate. On the other hand, when the amine value is 1,000 mgKOH/g or less, the second liquid material for forming a three-dimensional object has an appropriate viscosity and can be discharged stably. Without any limitation, any appropriate known titrator, for example, an automatic titrator COM-1500 (available from Hiranuma Sangyo Co., Ltd.) may be selected depending on the intended purpose and used for measuring the amine value according to a known method.

<<Organic Compound B>>

The organic compound B is not particularly limited and may be appropriately selected depending on the intended purpose so long as the organic compound B is an organic compound having reactivity with the organic compound A. Examples of the organic compound B include a water-soluble resin. Water-solubility of the water-soluble resin means that the resin dissolves in water in an amount of 10% by mass or greater at room temperature (25 degrees C.).

It is preferable that the organic compound B contain a basic functional group having reactivity with an acidic functional group.

Examples of the basic functional group include an amino group and an amide group.

Examples of the amino group include a primary amino group, a secondary amino group, and a tertiary amino group.

Examples of the organic compound B containing an amino group include polyethyleneimine, polyvinyl pyrrolidone, and polyallylamine.

The polyethyleneimine is preferably a branched type.

Examples of the organic compound B containing an amide group include polyacrylamide and polyurethane. One of these organic compounds may be used alone or two or more of these organic compounds may be used in combination.

The weight average molecular weight (Mw) of the polyethyleneimine is preferably 1,800 or greater, more preferably 1,800 or greater but 70,000 or less, and particularly preferably 3,000 or greater but 20,000 or less. When the weight average molecular weight (Mw) of the polyethyleneimine is 1,800 or greater, the polyethyleneimine can easily form a cross-linked structure with the organic compound A containing an acidic functional group in the first liquid material for forming a three-dimensional object, and a hardening time for hardening a three-dimensional object will be appropriate. On the other hand, when the weight average molecular weight (Mw) of the polyethyleneimine is 70,000 or less, the second liquid material for forming a three-dimensional object has an appropriate viscosity and can be discharged stably. The weight average molecular weight (Mw) can be measured by, for example, a gel permeation chromatography (GPC) method.

The weight average molecular weight (Mw) of the polyallylamine is preferably 1,600 or greater, more preferably 1,600 or greater but 50,000 or less, and particularly preferably 1,600 or greater but 25,000 or less. When the weight average molecular weight (Mw) of the polyallylamine is 1,600 or greater, the polyallylamine can easily form a cross-linked structure with the organic compound A containing an acidic functional group in the first liquid material for forming a three-dimensional object, and a hardening time for hardening a three-dimensional object will be appropriate. On the other hand, when the weight average molecular weight (Mw) of the polyallylamine is 50,000 or less, the second liquid material for forming a three-dimensional object has an appropriate viscosity and can be discharged stably. The weight average molecular weight (Mw) can be measured by, for example, a gel permeation chromatography (GPC) method.

The content of the organic compound B is preferably 3 parts by mass or greater but 20 parts by mass or less relative to 100 parts by mass of the second liquid material for forming a three-dimensional object. When the content of the organic compound B is 3 parts by mass or greater, the organic compound B can form a sufficient cross-linked structure with the organic compound A in the first liquid material for forming a three-dimensional object, and a green sheet or a green body to be obtained can have a better strength. On the other hand, when the content of the organic compound B is 20 parts by mass or less, the viscosity of the second liquid material for forming a three-dimensional object can be suppressed and the discharging stability of the second liquid material can be improved.

Without any limitation, any appropriate known thermal analyzer, for example, DSC-200 (available from Seiko Instruments Inc.) may be selected depending on the intended purpose and used for measuring the content of the organic compound B according to a known method.

The amine value of the organic compound B is preferably 300 mgKOH/g or greater but 1,500 mgKOH/g or less, more preferably 300 mgKOH/g or greater but 1,200 mgKOH/g or less, and particularly preferably 400 mgKOH/g or greater but 1,200 mgKOH/g or less. When the amine value of the organic compound B is 300 mgKOH/g or greater, a lot of basic moieties are present. Therefore, the organic compound B can easily form a cross-linked structure with the organic compound A containing an acidic functional group in the first liquid material for forming a three-dimensional object, and a hardening time for hardening a three-dimensional object will be appropriate. On the other hand, when the amine value of the organic compound B is 1,500 mgKOH/g or less, the second liquid material for forming a three-dimensional object has an appropriate viscosity and can be discharged stably. Without any limitation, any appropriate known titrator, for example, an automatic titrator COM-1500 (available from Hiranuma Sangyo Co., Ltd.) may be selected depending on the intended purpose and used for measuring the amine value according to a known method.

[Method for Confirming Novel Covalent Bonds Between Organic Compound A and Organic Compound B]

It is possible to confirm novel covalent bonds between the organic compound A and the organic compound B by a measurement using a high solid resolution $^{13}$C-NMR (instrument name: ECX-500 NMR, available from JEOL Ltd.) spectrum. The measurement conditions and the measurement samples are as follows.

—Measurement Conditions—
Cumulative number of times: 40,000 times
C.T.=2 msec
SW=240 ppm
Offset=110 ppm
Rotation=16 kHz (127.2 ppm)
X_amp_CP=52.7%
X_amp_grad=22.0%

—Measurement Samples—
Organic compound A alone
Organic compound B alone
A sample obtained by mixing the organic compound A and the organic compound B at a ratio by mole of 1:1 in highly pure water and drying the resultant in a thermostat bath at 50 degrees C. for 24 hours A sample obtained by mixing the organic compound A, the organic compound B, and a condensation agent at a ratio by mole of 1:1:1 in highly pure water and drying the resultant in a thermostat bath at 50 degrees C. for 24 hours A sample obtained by mixing the organic compound A and the organic compound B at a ratio by mole of 1:1 in highly pure water and heating the resultant with a hot plate at 150 degrees C.

<<Polyvalent Alcohol Containing 6 or Less Carbon Atoms>>

As the polyvalent alcohol containing 6 or less carbon atoms, the same polyvalent alcohol as used as the solvent of the first liquid material for forming a three-dimensional object can be used.

As the polyvalent alcohol, the same polyvalent alcohol as, or a different polyvalent alcohol from the polyvalent alcohol used as the solvent of the first liquid material for forming a three-dimensional object can be used.

<<Aqueous Medium Other than Polyvalent Alcohol Containing 6 or Less Carbon Atoms>>

Examples of the aqueous medium other than the polyvalent alcohol containing 6 or less carbon atoms include water, alcohols such as methanol and ethanol, ether, and ketone. One of these aqueous media may be used alone or two or more of these aqueous media may be used in combination. Among these aqueous media, water is preferable. The aqueous medium may be the water that contains a component other than water, such as the alcohols, in a slight amount.

Examples of the water include pure water such as ion-exchanged water, ultrafiltrated water, reverse osmotic water, and distilled water, and ultrapure water.

<<Other Components>>

Examples of the other components include a dehydration-condensation agent, a surfactant, a preservative, an antiseptic, a stabilizer, and a pH adjustor.

The second liquid material for forming a three-dimensional object is suitable for use in easy, efficient production of various laminated objects and structures, and particularly suitable for use in a three-dimensional object producing method and a three-dimensional object producing apparatus of the present disclosure described below.

<Third Liquid Material for Forming Three-Dimensional Object (Third Liquid Material for Laminated Object Manufacturing)>

The third liquid material for forming a three-dimensional object contains an alkali metal hydroxide that dissolves the organic compound A, and further contains an aqueous medium, a surfactant, and other components as needed.

<<Alkali Metal Hydroxide>>

The alkali metal hydroxide is not particularly limited and may be appropriately selected depending on the intended purpose so long as the alkali metal hydroxide has reactivity with the organic compound A to form a salt. Examples of the alkali metal hydroxide include a substance that forms a salt with the organic compound A.

Examples of the alkali metal hydroxide include lithium hydroxide, sodium hydroxide, and potassium hydroxide. The reactivity means an ionic interaction with the acidic group of the organic compound A, resulting in formation of a salt.

It is preferable that the third liquid material for forming a three-dimensional object contain a plurality of alkali metal hydroxides.

The content of the alkali metal hydroxide is preferably 1 part by mass or greater but 20 parts by mass or less relative to 100 parts by mass of the third liquid material for forming a three-dimensional object. When the content of the alkali metal hydroxide is 1 part by mass or greater, the alkali metal hydroxide can sufficiently form a salt with the organic compound A in the first liquid material for forming a three-dimensional object and can dissolve only a portion of the organic compound A (the organic compound A remaining unreacted) other than a portion of the organic compound A having reacted with the organic compound B contained in the second liquid material for forming a three-dimensional object. This makes it possible to take out a green sheet or a green body obtained, without damaging the green sheet or the green body. On the other hand, when the content of the alkali metal hydroxide is 20 parts by mass or less, the viscosity of the third liquid material for forming a three-dimensional object can be low. Therefore, even fine portions of the green body can be immersed with the liquid material, and it is possible to take out the green body with a greater precision.

<<Aqueous Medium>>

Examples of the aqueous medium include water, and alcohols such as methanol and ethanol. One of these aqueous media may be used alone or two or more of these aqueous media may be used in combination. Among these aqueous media, water is preferable. The aqueous medium may be the water that contains a component other than water, such as the alcohols, in a slight amount. Examples of the water include pure water such as ion-exchanged water, ultrafiltrated water, reverse osmotic water, and distilled water, and ultrapure water.

<<Surfactant>>

The surfactant is not particularly limited and may be appropriately selected depending on the intended purpose so long as the surfactant does not have reactivity with the organic compound A. Examples of the surfactant include anionic surfactants and nonionic surfactants. Examples of the anionic surfactant include alkylbenzene sulfonate, α-olefin sulfonate, phosphate, disulfonate, cholate, and deoxycholate.

Examples of the nonionic surfactant include fatty acid amide derivatives, polyvalent alcohol derivatives, and poly(oxyethylene)octylphenyl ether.

<<Other Components>>

Examples of the other components include a preservative, an antiseptic, a stabilizer, and a pH adjustor.

[Density of Three-Dimensional Object after Sintering]

The density of the three-dimensional object after sintering is preferably 93% or higher. The density of the three-dimensional object after sintering can be measured according to JIS-R-1634, using AD-1653 available from A&D Company, Limited.

[Rockwell Hardness of Three-Dimensional Object after Sintering]

A Rockwell hardness of the three-dimensional object after sintering is not particularly limited and may be appropriately selected depending on the intended purpose.

When the zirconia particles are used, the Rockwell hardness of the three-dimensional object after sintering is preferably 70 HRA or greater and more preferably 80 HRA or greater.

When the lithium disilicate particles are used, the Rockwell hardness of the three-dimensional object after sintering is preferably 50 HRA or greater and more preferably 60 HRA or greater.

When the titanium particles are used, the Rockwell hardness of the three-dimensional object after sintering is preferably 50 HRA or greater and more preferably 60 HRA or greater.

When silicon nitride particles are used, the Rockwell hardness of the three-dimensional object after sintering is preferably 50 HRA or greater and more preferably 55 HRA or greater.

For example, the Rockwell hardness can be measured according to JIS-Z-2245, using HR-110MR available from Mitutoyo Corporation.

[Bending Strength or Proof Stress of Three-Dimensional Object after Sintering]

The bending strength or proof stress of the three-dimensional object after sintering is not particularly limited and may be appropriately selected depending on the intended purpose.

When the zirconia particles are used, the bending strength of the three-dimensional object after sintering is preferably 400 MPa or greater and more preferably 800 MPa or greater.

When the lithium disilicate particles are used, the bending strength of the three-dimensional object after sintering is preferably 200 MPa or greater and more preferably 350 MPa or greater.

When the titanium particles are used, the proof stress of the three-dimensional object after sintering is preferably 240 MPa or greater and more preferably 400 MPa or greater.

When silicon nitride particles are used, the bending strength of the three-dimensional object after sintering is preferably 600 MPa or greater and more preferably 800 MPa or greater.

The bending strength can be measured according to ISO-6871, using AUTOGRAPH-AGS-J available from Shimadzu Corporation. The proof stress can be measured according to JIS-T6123, using AUTOGRAPH-AGS-J available from Shimadzu Corporation. (Three-dimensional object (laminated object) producing method and three-dimensional object (laminated object) producing apparatus, and dental prosthesis producing method and dental prosthesis producing apparatus)

A three-dimensional object (laminated object) producing apparatus of the present disclosure includes a layer forming step and a liquid material applying step, preferably includes a layer drying step, an unreacted region removing step, and a sintering step, and further includes other steps as needed.

A three-dimensional object (laminated object) producing apparatus used in the present disclosure includes a liquid material layer supporting unit, a layer forming unit, and a liquid material applying unit, preferably includes a layer drying unit, an unreacted region removing unit, and a sintering unit, and further includes other units as needed.

The three-dimensional object (laminated object) producing method of the present disclosure can be favorably performed by the three-dimensional object producing apparatus used in the present disclosure. The layer forming step can be favorably performed by the layer forming unit. The layer drying step can be favorably performed by the layer drying unit. The liquid material applying step can be favorably performed by the liquid material applying unit. The unreacted region removing step can be favorably performed by the unreacted region removing unit. The sintering step can be favorably performed by the sintering unit. The other steps can be favorably performed by the other units.

The dental prosthesis producing method can be favorably performed by a dental prosthesis producing apparatus used in the present disclosure. The layer forming step can be favorably performed by the layer forming unit. The layer drying step can be favorably performed by the layer drying unit. The liquid material applying step can be favorably performed by the liquid material applying unit. The unreacted region removing step can be favorably performed by the unreacted region removing unit. The sintering step can be favorably performed by the sintering unit. The other steps can be favorably performed by the other units.

<Layer Forming Step and Layer Forming Unit>

The layer forming step is a step of forming a layer of a first liquid material for forming a three-dimensional object, using the first liquid material for forming a three-dimensional object of the present disclosure.

The layer forming unit is a unit configured to form a layer of a first liquid material for forming a three-dimensional object, using the first liquid material for forming a three-dimensional object of the present disclosure.

—Support—

A support (liquid material layer supporting unit) is not particularly limited and may be appropriately selected depending on the intended purpose so long as the first liquid material for forming a three-dimensional object can be placed on the support. Examples of the support include a table having a placing surface on which the first liquid material for forming a three-dimensional object is placed, and a base plate of the apparatus illustrated in FIG. 1 of Japanese Unexamined Patent Application Publication No. 2000-328106. The surface of the support, i.e., the placing surface on which the first liquid material for forming a three-dimensional object is placed may be, for example, a smooth surface, a coarse surface, a planar surface, or a curved surface.

—Formation of Layer of First Liquid Material for Forming Three-Dimensional Object—

The method for placing the first liquid material for forming a three-dimensional object on the support is not particularly limited and may be appropriately selected depending on the intended purpose. Examples of a method for placing the first liquid material for forming a three-dimensional object (a slurry material) as a thin layer include a method using, for example, a known counter rotating mechanism (counter roller) employed in a selective laser sintering method described in Japanese Patent No. 3607300, a method for spreading the slurry material to have a form of a thin layer with such a member as a brush, a roller, and a blade, a method for pressing the surface of a layer of the slurry material with a pressing member to spread the slurry material to have a form of a thin layer, and a method using a known powder laminated object manufacturing apparatus.

For example, the following procedure may be performed to place the slurry material on the support with, for example, the counter rotating mechanism (counter roller), the brush, the roller, or the blade, or the pressing member. That is, with, for example, the counter rotating mechanism (counter roller), the brush, the roller, or the blade, or the pressing member, the slurry material is placed on the support that is disposed within an outer frame (may also be referred to as, for example, "mold", "hollow cylinder", or "tubular structure") in a manner that the support can lift upward and downward while sliding against the inner wall of the outer frame. When the support used is a support that can lift upward and downward within the outer frame, the support is disposed at a position slightly lower than the upper-end opening of the outer frame, i.e. at a position lower by an amount corresponding to the thickness of a layer of the first liquid material for forming a three-dimensional object (a layer of the slurry material), and then the slurry material is placed on the support. In this way, the slurry material can be placed on the support as a thin layer.

When a laser, an electron beam, or the second liquid material for forming a three-dimensional object is caused to act on the slurry material placed as a thin layer in the way described above, hardening occurs. When the slurry material is placed as a thin layer in the same way as described above on the obtained hardened product of the thin layer and a laser, an electron beam, or the second liquid material for forming a three-dimensional object is caused to act on the (layer of) the slurry material placed as a thin layer, hardening occurs. This hardening occurs not only in the (layer of) the slurry material placed as a thin layer, but also between this layer of the slurry material and the underlying hardened product of the thin layer obtained in the earlier hardening. As a result, a hardened product (three-dimensional object) having a thickness corresponding to about two layers of the slurry material placed as a thin layer is obtained.

An automatic simple method using the known powder laminated object manufacturing apparatus can also be employed in order to place the slurry material as a thin layer on the support. The powder laminated object manufacturing apparatus typically includes a recoater configured to laminate layers of the slurry material, a movable supplying tank configured to supply the slurry material onto the support, and a movable forming tank in which the slurry material is placed as thin layers and laminated. In the powder laminated object manufacturing apparatus, it is possible to constantly place the surface of the supplying tank at a height slightly higher than the surface of the forming tank, by lifting the supplying tank upward, lifting the forming tank downward, or both, it is to possible to actuate the recoater from the supplying tank side and place the slurry material as a thin layer, and it is also possible to laminate thin layers of the slurry material by repeatedly moving the recoater. This powder laminated object manufacturing apparatus may be diverted as is for slurry layer lamination, or the recoater may be replaced with a doctor blade for sheet formation.

The thickness of the layer of the slurry material is not particularly limited and may be appropriately selected depending on the intended purpose. For example, an average thickness per layer is preferably 3 micrometers or greater but 200 micrometers or less and more preferably 10 micrometers or greater but 100 micrometers or less. When the average thickness is 3 micrometers or greater, a time taken until a three-dimensional object can be obtained will be appropriate, and problems such as a shape collapse will not occur during treatment such as sintering or during handling. On the other hand, when the average thickness is 200 micrometers or less, a three-dimensional object can be provided with a sufficient dimensional precision. The average thickness can be measured according to a known method.

The surface roughness (Ra) of the layer of the slurry material after volatilization of the solvent is preferably 0.1 micrometers or greater but 10 micrometers or less. When the surface roughness (Ra) of the layer of the slurry material is 0.1 micrometers or greater, ink permeation can be promoted because the surface is adequately rough. When the surface roughness (Ra) of the layer of the slurry material is 10 micrometers or less, the amount of the second liquid material for forming a three-dimensional object to be applied can be uniform on the surface of the laminated layer. When the surface roughness (Ra) of the layer of the slurry material is in the range described above, the adhesive force between the layers of a green body to be obtained by object formation can be sufficient.

It is preferable that the surface roughness in a stable state obtained by the slurry being dried through a drying step be 0.1 micrometers or greater but 10 micrometers or less. When the slurry has a stable state, layer lamination can be suppressed from being uneven layer by layer.

The surface roughness (Ra) can be measured in the manner described below. The first liquid material for forming a three-dimensional object (slurry) is spread, and, for example, desolventization is performed as needed, to bring the layer of the slurry material into a state before application of the second liquid material for forming a three-dimensional object. Here, the layer of the first liquid material for forming a three-dimensional object is measured selectively at arbitrary 5 positions of the layer surface, with a laser microscope (instrument name: VK-X250, available from Keyence Corporation). An object lens for a magnification of ×20 is used. The average of the obtained measured values is calculated as the surface roughness (Ra).

<Layer Drying Step and Layer Drying Unit>

The layer drying step is a step of drying the obtained slurry layer after the layer forming step and before the liquid material applying step. The layer drying step is performed by the layer drying unit. Needless to say, natural drying may be employed. In the layer drying step, a water component (solvent) contained in the slurry layer can be volatilized. In the layer drying step, it is preferable not to completely remove the solvent from the slurry layer, but to bring the slurry layer into a semi-dry state. Examples of the layer drying unit include a known dryer.

The drying time in the layer drying step can be appropriately changed. When the drying time is long, there is a tendency that the liquid material to be applied in the liquid material applying step after the layer drying step is suppressed from bleeding out in a horizontal direction to improve the object formation precision, but the inter-layer adhesive force is week. On the other hand, when the drying time is short, there is a tendency that the particles move between the layers to strengthen the inter-layer adhesive force, but the liquid material to be applied in the liquid material applying step after the layer drying step bleeds out in the horizontal direction to degrade the object formation precision. The drying time may be appropriately selected depending on the kinds of the materials used.

<Liquid Material Applying Step and Liquid Material Applying Unit>

The liquid material applying step is a step of applying the second liquid material for forming a three-dimensional object containing an aqueous medium (a material for laminated object manufacturing) to the layer of the slurry material, i.e., to a predetermined region of the layer of the first liquid material for forming a three-dimensional object.

The liquid material applying unit is a unit configured to apply the second liquid material for forming a three-dimensional object containing an aqueous medium (a material for laminated object manufacturing) to the layer of the slurry material, i.e., to a predetermined region of the layer of the first liquid material for forming a three-dimensional object.

The method for applying the second liquid material for forming a three-dimensional object to the layer of the slurry material is not particularly limited and may be appropriately selected depending on the intended purpose. Examples of the method include liquid discharging units used in, for example, a dispenser method, a spray method, and an inkjet method. In the present disclosure, a liquid discharging unit used in the inkjet method (i.e., a unit configured to discharge liquid droplets from a plurality of nozzles using a vibrating element such as a piezoelectric actuator) is preferable, because this method can form a complicated three-dimensional shape with a good precision efficiently.

<Heating Step for Three-Dimensional Object (Green Body)>

It is preferable to heat the three-dimensional object (green body) with, for example, an infrared heater, a hot plate, or a high-temperature heating furnace. For example, it is known that when a polyion complex between polyacrylic acid and polyethyleneimine is heated at 150 degrees C. or higher for 10 minutes or longer, the cross-linking formed by the electrostatic interaction can be partially changed to amide bonds (covalent bonds), which are chemical bonds (see Advances in Colloid and Interface Science 158 (2010) pp. 84-93).

The heating step is not particularly limited and may be appropriately selected depending on the intended purpose. It is preferable to perform the heating step after the repetitive layer lamination and before the removing step of removing an unreacted slurry material. Furthermore, it is preferable to perform the heating step in a temperature range from a temperature at which the bonds of the polyion complex formed by the electrostatic interaction become able to undergo a dehydration-condensation reaction to form covalent bonds such as amide bonds to a temperature by which the dehydration-condensation reaction cannot progress completely and hence until which the bonds formed by the electrostatic interaction can exist. When the dehydration reaction by heating has progressed too sufficiently, the three-dimensional object (green body) may become brittle. If the three-dimensional object is brittle, it is difficult to take out only the region to which the second liquid material for forming a three-dimensional object has been applied, as the three-dimensional object, without deficiency such as chipping.

The heating temperature is not particularly limited, may be appropriately selected depending on the intended purpose, and is preferably 100 degrees C. or higher but 300 degrees C. or lower and more preferably 100 degrees C. or higher but 200 degrees C. or lower.

<Removing Step and Removing Unit>

The removing step is a step of immersing the three-dimensional object formed by sequentially repeating the layer forming step and the liquid material applying step in the third liquid material for forming a three-dimensional object to remove an unreacted slurry material. In the removing step, the organic compound A contained in the layer of the unreacted slurry can be changed to a salt to have water-solubility. Examples of the removing unit include collapsing by still standing, collapsing by ultrasonic irradiation, and collapsing by liquid stirring. The removal time in the removing step can be appropriately changed. When the removal time is long, there is a tendency that the hardened product obtained in the liquid material applying step collapses because minute acidic groups contained in the reaction product between the organic compound A and the organic compound B undergo the reaction to become water-soluble. On the other hand, when the removal time is short, there is a tendency that the removal is insufficient because the acidic groups contained in the layer of the unreacted slurry do not undergo the reaction sufficiently. The removal time may be appropriately selected depending on the kinds of the materials used.

<Sintering Step and Sintering Unit>

The sintering step is a step of sintering the three-dimensional object (green body) formed by sequentially repeating the layer forming step and the liquid material applying step, and is performed by the sintering unit. Through the sintering step, the hardened product can be changed to an integrated compact (sintered body).

Examples of the sintering unit include a known sintering furnace.

As the sintering step, there is a method for performing sintering at the same time as laminating layers of the first liquid material for forming a three-dimensional object, as well as a method for sintering a hardened product after the hardened product is obtained as described above. The method for performing sintering at the same time as laminating layers of the first liquid material for forming a three-dimensional object is a method for irradiating the layers of the first liquid material for forming a three-dimensional object with either a laser or an electron beam to sinter the layers of the first liquid material for forming a three-dimensional object.

—Laser Irradiation—

The laser in the laser irradiation is not particularly limited and may be appropriately selected depending on the intended purpose. Examples of the laser include a $CO_2$ laser, a Nd-YAG laser, a fiber laser, and a semiconductor laser. The conditions for the laser irradiation are not particularly limited and may be appropriately selected depending on the intended purpose. For example, when a compact laser is used, the compact laser is incapable of melting the inorganic particles contained in the first liquid material for forming a three-dimensional object. Therefore, for forming an object, it is preferable to mix an adhesive (for example, a polyester-based adhesive) to be used in combination and melt the adhesive by laser irradiation. In this case, it is preferable to use a $CO_2$ laser. Preferable irradiation conditions include a laser output of 15 W, a wavelength of 10.6 micrometers, and a beam diameter of about 0.4 mm.

—Electron Beam Irradiation—

The electron beam irradiation is not particularly limited except that an electron beam for irradiation has an energy by which the inorganic particles contained in the first liquid material for forming a three-dimensional object can be melted, and may be appropriately selected depending on the intended purpose. For electron beam irradiation, there is a need for handling the first liquid material for forming a three-dimensional object under a vacuum environment. The conditions for the electron beam irradiation are not particularly limited and may be appropriately selected depending on the intended purpose. For example, an output of 1,500 W, a beam diameter of 0.1 mm, and a degree of vacuum of about $1.0 \times 10^{-5}$ mbar are preferable.

<Other Steps and Other Units>

Examples of the other steps include a surface protecting step and a painting step.

Examples of the other units include a surface protecting unit and a painting unit.

—Surface Protecting Step and Surface Protecting Unit—

The surface protecting step is a step of forming a protective layer on the three-dimensional object formed in the liquid material applying step or the sintering step. Through the surface protecting step, the surface of the three-dimensional object can be provided with, for example, durability that enables the three-dimensional object to be subjected to, for example, use as is.

Examples of the protective layer include a water-resistant layer, a weatherable layer, a light-resistant layer, a heat-insulating layer, and a gloss layer.

Examples of the surface protecting unit include known surface protection treatment apparatuses such as a spray apparatus and a coating apparatus.

—Painting Step and Painting Unit—

The painting step is a step of painting the three-dimensional object. Through the painting step, the three-dimensional object can be colored in a desired color. Examples of the painting unit include known painting apparatuses such as painting apparatuses using, for example, a spray, a roller, and a brush.

FIG. 1 illustrates an example of a three-dimensional object producing apparatus used in the present disclosure. The three-dimensional object producing apparatus of FIG. 1 includes a forming-side slurry storing tank 1 and a supplying-side slurry storing tank 2. Each of these slurry storing tanks includes a stage 3 movable upward and downward. Layers of the slurry material are formed on the stage.

Above the forming-side slurry storing tank 1, there is provided an inkjet head 5 configured to discharge the second liquid material 4 for forming a three-dimensional object toward the first liquid material for forming a three-dimensional object (slurry material) in the slurry storing tank. Further, there is also provided a leveling mechanism 6 (hereinafter, may also be referred to as recoater) configured to supply the slurry material from the supplying-side slurry storing tank 2 to the forming-side slurry storing tank 1 and level the surface of a layer of the slurry material in the forming-side slurry storing tank 1.

The second liquid material 4 for forming a three-dimensional object is dropped from the inkjet head 5 onto the slurry material in the forming-side slurry storing tank 1. Here, the position to which the second liquid material 4 for forming a three-dimensional object is dropped is determined based on two-dimensional image data (slice data) representing a plurality of planar layers into which a three-dimensional shape finally desired is sliced.

When printing on one layer is completed, the stage 3 of the supplying-side slurry storing tank 2 is lifted up, and the stage 3 of the forming-side slurry storing tank 1 is lifted down. This produces a height difference. An amount of the slurry material corresponding to the height difference is moved to the forming-side slurry storing tank 1 by the leveling mechanism 6.

In this way, a new layer of the slurry material is formed on the surface of the slurry material layer on which printing is performed before. The thickness per layer of the slurry material is about some tens of micrometers or greater but 100 micrometers or less. Printing is performed on the layer of the slurry material newly formed based on the slice data of the second layer. This series of process is repeated, to obtain a three-dimensional object.

Figure 2:
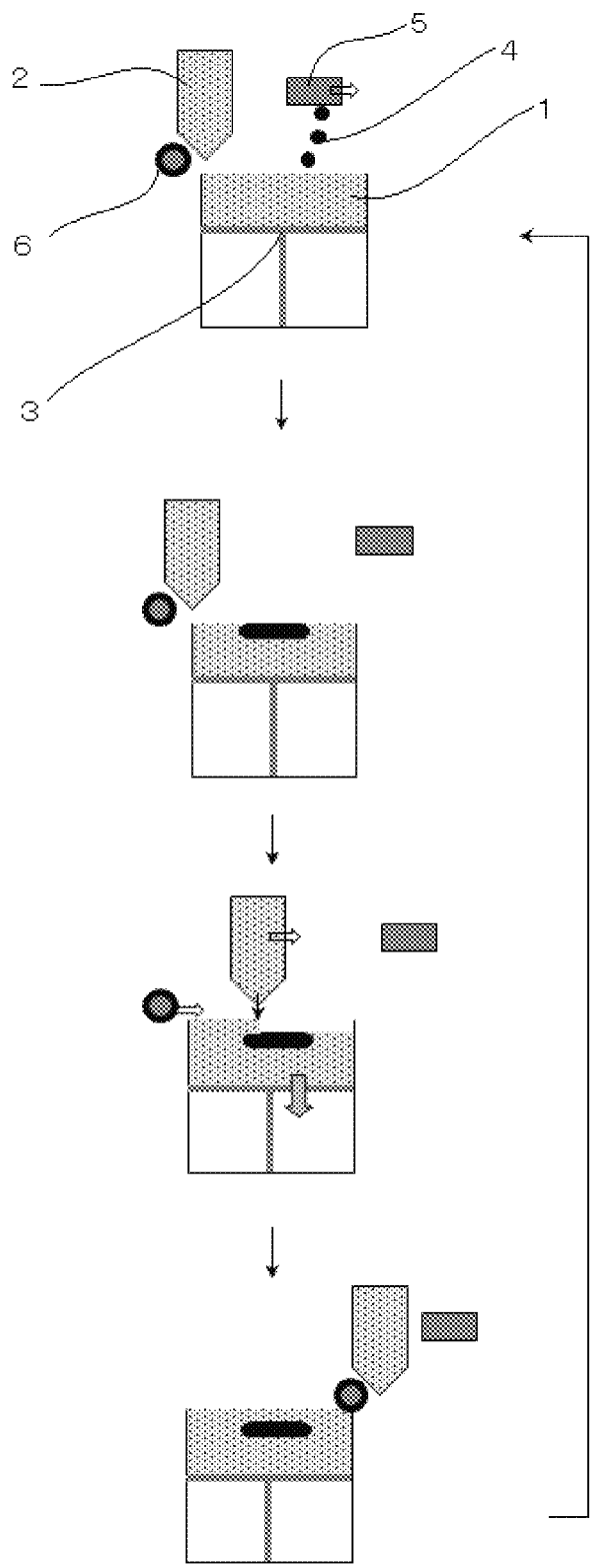
FIG. 2 is a schematic diagram illustrating another example of a three-dimensional object producing apparatus of the present disclosure.

FIG. 2 illustrates another example of a slurry laminated object manufacturing apparatus used in the present disclosure. The three-dimensional object producing apparatus of FIG. 2 is identical with FIG. 1 in principle but different in the mechanism of supplying the first liquid material for forming a three-dimensional object (slurry material). That is, the supplying-side slurry storing tank 2 is disposed above the forming-side slurry storing tank 2. When printing on the first layer is completed, the stage 3 of the forming-side slurry storing tank 1 lifts down by a predetermined amount, and the supplying-side slurry storing tank 2 moves while dropping the slurry material in a predetermined amount into the forming-side slurry storing tank 1, to form a new layer of the slurry material. Subsequently, the leveling mechanism 6 compresses the layer of the first liquid material for forming a three-dimensional object (slurry material) to increase the bulk density, and levels off the layer of the slurry material to a uniform height.

The three-dimensional object producing apparatus having the configuration illustrated in FIG. 2 can be made smaller in size than the configuration of FIG. 1 in which two slurry storing tanks are arranged horizontally.

<Three-Dimensional Object (Sintered Body)>

A three-dimensional object (sintered body) is produced by the three-dimensional object producing method of the present disclosure.

It is preferable that the three-dimensional object (sintered body) be an artificial tooth because the three-dimensional object (sintered body) can endure a chewing force in an oral cavity for a long term and has an aesthetic property.

The artificial tooth is a tooth artificially made for recovering the function of a natural tooth that is lost due to, for example, dental caries, external injury, and periodontal disease. The artificial tooth encompasses a dental prosthesis such as a bridge and a crown.

The three-dimensional object producing method of the present disclosure and the three-dimensional object producing apparatus of the present disclosure can produce an object having a complicated three-dimensional shape easily, efficiently, without a shape collapse before, for example, sintering, and with a favorable dimensional precision, using the material set for forming a three-dimensional object of the present disclosure. The three-dimensional object obtained in this way has no cytotoxicity, has a sufficient strength and an excellent dimensional precision, and can reproduce, for example, minute concavo-convexes and a curved surface. Therefore, the three-dimensional object has an excellent aesthetic appearance and a high quality, and can be favorably used for various applications.

EXAMPLES

The present disclosure will be described below by way of Examples. The present disclosure should not be construed as being limited to these Examples.

In Examples and Comparative Examples below, examples in which laminated objects were produced without using molds are presented. However, these examples are non-limiting.

Preparation Example 1 of First Liquid Material for Forming Three-Dimensional Object (Slurry Material)

<Synthesis of Inorganic Particles 1>

An 18% by mass yttrium chloride aqueous solution was mixed with a 20% by mass zirconium oxychloride aqueous solution such that an equivalent ratio by mole between yttria and zirconia (yttria:zirconia) would be 2.8:97.2. To the resultant, sodium chloride was added in an amount of 0.5% by mass of the total amount of zirconium oxychloride and dissolved.

Next, to the obtained aqueous solution, aluminum chloride was added such that an amount as alumina would be 0.4% by mass of the total amount of zirconia, and dissolved. The resultant aqueous solution was subjected to spray drying in the air having a temperature of 200 degrees C., to obtain a dry powder. The obtained dry powder was fired in the air at a temperature of 1,000 degrees C., to synthesize a calcined powder. The monoclinic rate of the obtained calcined powder was 8.2%. This calcined powder was pulverized with a wet attritor, to obtain a 30% by mass slurry. Next, the obtained slurry was repeatedly subjected to dilution and filtration concentration with a membrane filter having a mesh size of 0.5 micrometers, and repeatedly washed until the electric conductivity of the filtrate became 20 microsiemens or lower, to synthesize inorganic particles 1 (zirconia particles) (with bio-compatibility). The monoclinic rate of the calcined powder was identified in the manner described below. [Identification of crystalline phase rate of inorganic particles 1 (zirconia particles)]

Identification of the crystalline phase of zirconia, which was the synthesized inorganic particles 1, was performed with an X-ray powder diffractometer (available from Rigaku Corporation, RINT 1100) under the conditions described below.

[Measurement Conditions]
Tube: Cu
Voltage: 40 kV
Current: 40 mA
Start angle: 3 degrees
End angle: 80 degrees
Scan speed: 0.5 degrees/min The monoclinic rate (%) of zirconia was calculated according to the formula (1) below based on the reflection peak intensities Im(111), Im(11-1), It(111), and Ic(111) of a 111 face and a 11-1 face of a monoclinic phase, a 111 face of a tetragonal phase, and a 111 face of a cubic phase by a powder X-ray diffractometry measurement.

$$\text{Monoclinic rate (\%)} = [Im(111) + Im(11\text{-}1)] / [Im(111) + Im(11\text{-}1) + It(111) + Ic(111)] \quad [\text{Formula (1)}]$$

<Preparation of First Liquid Material for Forming Three-Dimensional Object (Slurry Material) 1>

The inorganic particles 1 (zirconia particles) (30.0 parts by mass), a polyacrylic acid A having a weight average molecular weight (Mw) of 800,000 (PAA, available from Nippon Shokubai Co., Ltd., AS-58) (13.0 parts by mass), benzylbutyl phthalate as a plasticizer (available from Wako Pure Chemical Industries, Ltd.) (10.0 parts by mass), a dispersant for ceramics (MALIALIM, available from NOF Corporation, AKM-0531) (1.5 parts by mass), and ethanol (60.0 parts by mass) were mixed and subjected to dispersion treatment for 3 hours using a bead mill with zirconia beads having a diameter of 3 mm, to obtain a first liquid material for forming a three-dimensional object (slurry material) 1.

The volume average particle diameter of the inorganic particles in the obtained first liquid material for forming a three-dimensional object (slurry material) 1 was measured in the manner described below.

—Volume Average Particle Diameter of Inorganic Particles—

The volume average particle diameter of the inorganic particles in the first liquid material for forming a three-dimensional object (slurry material) 1 was measured with an instrument named LA-920 (available from Horiba, Ltd.). In the measurement with LA-920, an application (Ver. 3.32) (available from Horiba, Ltd.) dedicated for LA-920 was used for an analysis. Specifically, background measurement was performed after optical axis adjustment was performed with chloroform. Subsequently, circulation was started, and the first liquid material for forming a three-dimensional object (slurry material) was dropped. After it was confirmed that the transmittance had stabilized, ultrasonic irradiation was performed under the conditions described below. The volume average particle diameter was measured on the condition that the transmittance after irradiation would fall within a range of 70% or higher but 95% or lower. The measurement was performed on the condition that the transmittance of LA-920 would wall within a range of 70% or higher but 95% or lower in terms of measurement reproducibility of the volume average particle diameter. The measurement would be performed again if the transmittance after ultrasonic irradiation had not fallen within the value. In order to obtain a transmittance value, the amount of the first liquid material for forming a three-dimensional object (slurry material) to be dropped was adjusted. The conditions for measurement and analysis were set as follows.

[Conditions for Measurement and Analysis]
Number of times of data acquisition: 15 times
Relative refractive index: 1.20
Circulation: 5
Ultrasonic intensity: 7

Preparation Examples 2 to 26 of First Liquid Material for Forming Three-Dimensional Object (Slurry Material)

<Preparation of First Liquid Materials for Forming Three-Dimensional Object (Slurry Materials) 2 to 26>

First liquid materials for forming a three-dimensional object (slurry materials) 2 to 26 were obtained in the same manner as in Preparation example 1 of first liquid material for forming three-dimensional object (slurry material), except that unlike in Preparation example 1 of first liquid material for forming three-dimensional object (slurry material), the compositions and contents were changed to as presented in Table 1 to Table 4 below. The volume average particle diameters of the inorganic particles were measured in the same manner as in Preparation example 1 of first liquid material for forming three-dimensional object (slurry material).

The compositions of the first liquid materials for forming a three-dimensional object (slurry materials) 1 to 26 and the volume average particle diameters of the inorganic particles are presented in Table 1 to Table 4 below.

TABLE 1

| | | First liquid material for forming three-dimensional object | | | | | | | |
|---|---|---|---|---|---|---|---|---|---|
| | | 1 | 2 | 3 | 4 | 5 | 6 | 7 | 8 |
| Inorganic particles | Zirconia particles | 30.0 | 30.0 | 30.0 | 30.0 | 30.0 | — | — | — |
| | Lithium disilicate particles | — | — | — | — | — | 30.0 | — | — |
| | Titanium particles | — | — | — | — | — | — | 30.0 | — |
| | Silicon nitride particles | — | — | — | — | — | — | — | 30.0 |
| Organic compound A | Polyacrylic acid A (weight average molecular weight: 800,000) | 13.0 | — | — | 5.0 | 30.0 | 13.0 | 13.0 | 13.0 |
| | Polyacrylic acid B (weight average molecular weight: 400,000) | — | — | 13.0 | — | — | — | — | — |
| | Polyacrylic acid C (weight average molecular weight: 300,000) | — | — | — | — | — | — | — | — |
| | Polyvinylpyrrolidone (weight average molecular weight: 100,000) | — | 13.0 | — | — | — | — | — | — |
| Solvent | Ethanol | 60.0 | 60.0 | 60.0 | 60.0 | 60.0 | 60.0 | 60.0 | 60.0 |
| | Methanol | — | — | — | — | — | — | — | — |
| | Toluene | — | — | — | — | — | — | — | — |
| Dehydration-condensation agent | 4-(4,6-dimethoxy-1,3,5-triazin-2-yl)-4-methyl morpholinium = chloride n-hydrate | — | — | — | — | — | — | — | — |
| | N,N'-dicyclohexylcarbodiimide | — | — | — | — | — | — | — | — |
| Plasticizer | Benzylbutyl phthalate | 10.0 | 10.0 | 10.0 | 10.0 | 10.0 | 10.0 | 10.0 | 10.0 |
| Dispersant | Dispersant for ceramics | 1.5 | 1.5 | 1.5 | 1.5 | 1.5 | 1.5 | 1.5 | 1.5 |
| Content (part by mass) of organic compound A relative to 100 parts by mass of inorganic particles | | 43.3 | 43.3 | 43.3 | 16.7 | 100.0 | 43.3 | 43.3 | 43.3 |
| Volume average particle diameter (micrometer) of inorganic particles in first liquid material for forming three-dimensional object | | 0.2 | 0.2 | 0.2 | 0.2 | 0.2 | 0.2 | 0.2 | 0.7 |

TABLE 2

| | | First liquid material for forming three-dimensional object | | | | | | | |
|---|---|---|---|---|---|---|---|---|---|
| | | 9 | 10 | 11 | 12 | 13 | 14 | 15 | 16 |
| Inorganic particles | Zirconia particles | — | — | 20.0 | 70.0 | 30.0 | 30.0 | 30.0 | 30.0 |
| | Lithium disilicate particles | 30.0 | — | — | — | — | — | — | — |
| | Titanium particles | — | 30.0 | — | — | — | — | — | — |
| | Silicon nitride particles | — | — | — | — | — | — | — | — |
| Organic compound A | Polyacrylic acid A (weight average molecular weight: 800,000) | 13.0 | 13.0 | 13.0 | 13.0 | 13.0 | — | 4.0 | 31.0 |
| | Polyacrylic acid B (weight average molecular weight: 400,000) | — | — | — | — | — | — | — | — |
| | Polyacrylic acid C (weight average molecular weight: 300,000) | — | — | — | — | — | 13.0 | — | — |
| | Polyvinylpyrrolidone (weight average molecular weight: 100,000) | — | — | — | — | — | — | — | — |

TABLE 2-continued

|  |  | First liquid material for forming three-dimensional object | | | | | | | |
|---|---|---|---|---|---|---|---|---|---|
|  |  | 9 | 10 | 11 | 12 | 13 | 14 | 15 | 16 |
| Solvent | Ethanol | 60.0 | 60.0 | 70.0 | 80.0 | — | 60.0 | 60.0 | 60.0 |
|  | Methanol | — | — | — | — | 60.0 | — | — | — |
|  | Toluene | — | — | — | — | — | — | — | — |
| Dehydration-condensation agent | 4-(4,6-dimethoxy-1,3,5-triazin-2-yl)-4-methyl morpholinium = chloride n-hydrate | — | — | — | — | — | — | — | — |
|  | N,N'-dicyclohexylcarbodiimide | — | — | — | — | — | — | — | — |
| Plasticizer | Benzylbutyl phthalate | 10.0 | 10.0 | 10.0 | 10.0 | 10.0 | 10.0 | 10.0 | 10.0 |
| Dispersant | Dispersant for ceramics | 1.5 | 1.5 | 1.5 | 1.5 | 1.5 | 1.5 | 1.5 | 1.5 |
| Content (part by mass) of organic compound A relative to 100 parts by mass of inorganic particles | | 43.3 | 43.3 | 65.0 | 18.6 | 43.3 | 43.3 | 13.3 | 103.3 |
| Volume average particle diameter (micrometer) of inorganic particles in first liquid material for forming three-dimensional object | | 5.0 | 50.0 | 0.2 | 0.2 | 0.2 | 0.2 | 0.2 | 0.2 |

TABLE 3

|  |  | First liquid material for forming three-dimensional object | | | | | | | |
|---|---|---|---|---|---|---|---|---|---|
|  |  | 17 | 18 | 19 | 20 | 21 | 22 | 23 | 24 |
| Inorganic particles | Zirconia particles | 30.0 | 30.0 | 19.0 | 71.0 | 30.0 | 30.0 | 30.0 | 30.0 |
|  | Lithium disilicate particles | — | — | — | — | — | — | — | — |
|  | Titanium particles | — | — | — | — | — | — | — | — |
|  | Silicon nitride particles | — | — | — | — | — | — | — | — |
| Organic compound A | Polyacrylic acid A (weight average molecular weight: 800,000) | 13.0 | 13.0 | 13.0 | 13.0 | 13.0 | — | 13.0 | — |
|  | Polyacrylic acid B (weight average molecular weight: 400,000) | — | — | — | — | — | — | — | 13.0 |
|  | Polyacrylic acid C (weight average molecular weight: 300,000) | — | — | — | — | — | — | — | — |
|  | Polyvinylpyrrolidone (weight average molecular weight: 100,000) | — | — | — | — | — | — | — | — |
| Solvent | Ethanol | 60.0 | 60.0 | 71.0 | 19.0 | — | 60.0 | — | 60.0 |
|  | Methanol | — | — | — | — | — | — | — | — |
|  | Toluene | — | — | — | — | 60.0 | — | — | — |
| Dehydration-condensation agent | 4-(4,6-dimethoxy-1,3,5-triazin-2-yl)-4-methyl morpholinium = chloride n-hydrate | — | — | — | — | — | — | — | 10.0 |
|  | N,N'-dicyclohexylcarbodiimide | — | — | — | — | — | — | — | — |
| Plasticizer | Benzylbutyl phthalate | 10.0 | 10.0 | 10.0 | 10.0 | 10.0 | 10.0 | 10.0 | 10.0 |
| Dispersant | Dispersant for ceramics | 1.5 | 1.5 | 1.5 | 1.5 | 1.5 | 1.5 | 1.5 | 1.5 |
| Content (part by mass) of organic compound A relative to 100 parts by mass of inorganic particles | | 43.3 | 43.3 | 68.4 | 18.3 | 43.3 | — | 43.3 | 43.3 |
| Volume average particle diameter (micrometer) of inorganic particles in first liquid material for forming three-dimensional object | | 6.0 | 51.0 | 0.2 | 0.2 | 0.2 | 0.2 | 0.2 | 0.2 |

TABLE 4

|  |  | First liquid material for forming three-dimensional object | |
|---|---|---|---|
|  |  | 25 | 26 |
| Inorganic particles | Zirconia particles | 30.0 | 30.0 |
|  | Lithium disilicate particles | — | — |
|  | Titanium particles | — | — |
|  | Silicon nitride particles | — | — |
| Organic compound A | Polyacrylic acid A (weight average molecular weight: 800,000) | — | — |

TABLE 4-continued

| | | First liquid material for forming three-dimensional object | |
|---|---|---|---|
| | | 25 | 26 |
| | Polyacrylic acid B (weight average molecular weight: 400,000) | 13.0 | 13.0 |
| | Polyacrylic acid C (weight average molecular weight: 300,000) | — | — |
| | Polyvinylpyrrolidone (weight average molecular weight: 100,000) | — | — |
| Solvent | Ethanol | 60.0 | 60.0 |
| | Methanol | — | — |
| | Toluene | — | — |
| Dehydration-condensation agent | 4-(4,6-dimethoxy-1,3,5-triazin-2-yl)-4-methyl morpholinium = chloride n-hydrate | 3.0 | — |
| | N,N'-dicyclohexylcarbodiimide | — | 10.0 |
| Plasticizer | Benzylbutyl phthalate | 10.0 | 10.0 |
| Dispersant | Dispersant for ceramics | 1.5 | 1.5 |
| Content (part by mass) of organic compound A relative to 100 parts by mass of inorganic particles | | 43.3 | 43.3 |
| Volume average particle diameter (micrometer) of inorganic particles in first liquid material for forming three-dimensional object | | 0.2 | 0.2 |

Product names and supplier names of the components in Table 1 to Table 4 above are as follows.

Polyacrylic acid A (PAA) having a weight average molecular weight (Mw) of 800,000: available from Nippon Shokubai Co., Ltd., product name: AS-58

Polyacrylic acid B (PAA) having a weight average molecular weight (Mw) of 400,000 was obtained by decomposing the polyacrylic acid A having a weight average molecular weight (Mw) of 800,000 (PAA, available from Nippon Shokubai Co., Ltd., product name: AS-58) with an ultrasonic device.

Polyacrylic acid C (PAA) having a weight average molecular weight (Mw) of 300,000 was obtained by decomposing the polyacrylic acid A having a weight average molecular weight (Mw) of 800,000 (PAA, available from Nippon Shokubai Co., Ltd., product name: AS-58) with an ultrasonic device.

Polyvinylpyrrolidone (PVP) having a weight average molecular weight (Mw) of 100,000: available from Nippon Shokubai Co., Ltd., product name: K-30

Lithium disilicate particles: a synthesized product, with bio-compatibility

Titanium particles: available from OSAKA Titanium Technologies, with bio-compatibility Silicon nitride particles: available from Denka Company Limited, product name: SN-9FWS 4-(4,6-Dimethoxy-1,3,5-triazin-2-yl)-4-methylmorpholinium=chloride n-hydrate: available from Wako Pure Chemical Industries, Ltd.

N,N'-dicyclohexylcarbodiimide: available from Wako Pure Chemical Industries, Ltd.

Preparation Example 1 of Second Liquid Material for Forming Three-Dimensional Object <Preparation of Second Liquid Material for Forming Three-Dimensional Object 1>

Water (88.0 parts by mass), polyethyleneimine A having a weight average molecular weight (Mw) of 10,000 (PEI, available from Nippon Shokubai Co., Ltd., SP-200) (12.0 parts by mass), and TWEEN 20 as a surfactant (available from Tokyo Chemical Industry Co., Ltd.) (0.5 parts by mass) were subjected to dispersion treatment for 30 minutes using a homomixer, to prepare a second liquid material for forming a three-dimensional object 1. The amine value of the second liquid material for forming a three-dimensional object 1 was measured with an automatic titrator COM-1500 (available from Hiranuma Sangyo Co., Ltd.).

Preparation Examples 2 to 19 of Second Liquid Material for Forming Three-Dimensional Object <Preparation of Second Liquid Materials for Forming Three-Dimensional Object 2 to 19>

Second liquid materials for forming a three-dimensional object 2 to 19 were obtained in the same manner as in Preparation example 1 of second liquid material for forming three-dimensional object, except that unlike in Preparation example 1 of second liquid material for forming three-dimensional object, the compositions and contents were changed to as presented in Table 5 to Table 7 below.

The compositions and contents of the second liquid materials for forming a three-dimensional object 1 to 19 are presented in Table 5 to Table 7 below.

TABLE 5

| | | Second liquid material for forming three-dimensional object | | | | | | | |
|---|---|---|---|---|---|---|---|---|---|
| | | 1 | 2 | 3 | 4 | 5 | 6 | 7 | 8 |
| Organic compound B | Polyethyleneimine A (weight average molecular weight: 10,000, amine value: 1,103 mgKOH/g) | 12.0 | — | 3.0 | 20.0 | — | — | 2.0 | 21.0 |
| | Polyethyleneimine B (weight average molecular weight: 1,800, amine value: 1,316 mgKOH/g) | — | 12.0 | — | — | — | — | — | — |
| | Polyethyleneimine C (weight average molecular weight: 1,500, amine value: 1,377 KOH/g) | — | — | — | — | 12.0 | — | — | — |
| | Polyallylamine A (weight average molecular weight: 8,000, amine value: 1,032 mgKOH/g) | — | — | — | — | — | — | — | — |
| | Polyallylamine B (weight average molecular weight: 1,600, amine value: 1,238 mgKOH/g) | — | — | — | — | — | — | — | — |
| | Polyallylamine C (weight average molecular weight: 1,200, amine value: 1,314 mgKOH/g) | — | — | — | — | — | — | — | — |
| | Polyacrylic acid D (weight average molecular weight: 10,000, amine value: 0 mgKOH/g) | — | — | — | — | — | — | — | — |
| | Polyacrylamide (weight average molecular weight: 10,000, amine value: 274 mgKOH/g) | — | — | — | — | — | — | — | — |
| | Polyurethane (weight average molecular weight: 5,000, amine value: 281 mgKOH/g) | — | — | — | — | — | — | — | — |
| | Polyvinylpyrrolidone (weight average molecular weight: 1,500, amine value: 306 mgKOH/g) | — | — | — | — | — | 30.0 | — | — |
| Dehydration-condensation agent | 4-(4,6-dimethoxy-1,3,5-triazin-2-yl)-4-methyl morpholinium = chloride n-hydrate | — | — | — | — | — | — | — | — |
| Surfactant | TWEEN 20 | 0.5 | 0.5 | 0.5 | 0.5 | 0.5 | 0.5 | 0.5 | 0.5 |
| | Water | 88.0 | 88.0 | 97.0 | 80.0 | 88.0 | 70.0 | 98.0 | 79.0 |
| | Amine value (mgKOH/g) of second liquid material for forming three-dimensional object | 135 | 147 | 100 | 202 | 152 | 101 | 93 | 216 |

TABLE 6

| | | Second liquid material for forming three-dimensional object | | | | | | | |
|---|---|---|---|---|---|---|---|---|---|
| | | 9 | 10 | 11 | 12 | 13 | 14 | 15 | 16 |
| Organic compound B | Polyethyleneimine A (weight average molecular weight: 10,000, amine value: 1,103 mgKOH/g) | — | — | — | — | — | — | — | 2.0 |
| | Polyethyleneimine B (weight average molecular weight: 1,800, amine value: 1,316 mgKOH/g) | — | — | — | — | — | — | — | — |
| | Polyethyleneimine C (weight average molecular weight: 1,500, amine value: 1,377 KOH/g) | — | — | — | — | — | — | — | — |
| | Polyallylamine A (weight average molecular weight: 8,000, amine value: 1,032 mgKOH/g) | 12.0 | — | — | — | — | — | — | — |
| | Polyallylamine B (weight average molecular weight: 1,600, amine value: 1,238 mgKOH/g) | — | 12.0 | — | — | — | 40.0 | — | — |
| | Polyallylamine C (weight average molecular weight: 1,200, amine value: 1,314 mgKOH/g) | — | — | 12.0 | — | — | — | — | — |
| | Polyacrylic acid D (weight average molecular weight: 10,000, amine value: 0 mgKOH/g) | — | — | — | — | — | — | 12.0 | — |
| | Polyacrylamide (weight average molecular weight: 10,000, amine value: 274 mgKOH/g) | — | — | — | 30.0 | — | — | — | — |

TABLE 6-continued

| | | Second liquid material for forming three-dimensional object | | | | | | | |
|---|---|---|---|---|---|---|---|---|---|
| | | 9 | 10 | 11 | 12 | 13 | 14 | 15 | 16 |
| | Polyurethane (weight average molecular weight: 5,000, amine value: 281 mgKOH/g) | — | — | — | — | 30.0 | — | — | — |
| | Polyvinylpyrrolidone (weight average molecular weight: 1,500, amine value: 306 mgKOH/g) | — | — | — | — | — | — | — | — |
| Dehydration-condensation agent | 4-(4,6-dimethoxy-1,3,5-triazin-2-yl)-4-methyl morpholinium = chloride n-hydrate | — | — | — | — | — | — | — | — |
| Surfactant | TWEEN 20 | 0.5 | 0.5 | 0.5 | 0.5 | 0.5 | 0.5 | 0.5 | 0.5 |
| | Water | 88.0 | 88.0 | 88.0 | 70.0 | 70.0 | 60.0 | 88.0 | 98.0 |
| Amine value (mgKOH/g) of second liquid material for forming three-dimensional object | | 128 | 146 | 151 | 102 | 104 | 298 | 0 | 94 |

TABLE 7

| | | Second liquid material for forming three-dimensional object | | |
|---|---|---|---|---|
| | | 17 | 18 | 19 |
| Organic compound B | Polyethyleneimine A (weight average molecular weight: 10,000, amine value: 1,103 mgKOH/g) | — | — | — |
| | Polyethyleneimine B (weight average molecular weight: 1,800, amine value: 1,316 mgKOH/g) | — | 12.0 | 12.0 |
| | Polyethyleneimine C (weight average molecular weight: 1,500, amine value: 1,377 KOH/g) | — | — | — |
| | Polyallylamine A (weight average molecular weight: 8,000, amine value: 1,032 mgKOH/g) | — | — | — |
| | Polyallylamine B (weight average molecular weight: 1,600, amine value: 1,238 mgKOH/g) | 42.0 | — | — |
| | Polyallylamine C (weight average molecular weight: 1,200, amine value: 1,314 mgKOH/g) | — | — | — |
| | Polyacrylic acid D (weight average molecular weight: 10,000, amine value: 0 mgKOH/g) | — | — | — |
| | Polyacrylamide (weight average molecular weight: 10,000, amine value: 274 mgKOH/g) | — | — | — |
| | Polyurethane (weight average molecular weight: 5,000, amine value: 281 mgKOH/g) | — | — | — |
| | Polyvinylpyrrolidone (weight average molecular weight: 1,500, amine value: 306 mgKOH/g) | — | — | — |
| Dehydration-condensation agent | 4-(4,6-dimethoxy-1,3,5-triazin-2-yl)-4-methyl morpholinium = chloride n-hydrate | — | 10.0 | 3.0 |
| Surfactant | TWEEN 20 | 0.5 | 0.5 | 0.5 |
| | Water | 58.0 | 78.0 | 85.0 |
| Amine value (mgKOH/g) of second liquid material for forming three-dimensional object | | 307 | 147 | 147 |

Product names and supplier names of the components in Table 5 to Table 7 above are as follows.

Polyethyleneimine A (PEI) having a weight average molecular weight (Mw) of 10,000: available from Nippon Shokubai Co., Ltd., product name: SP-200, an amine value: 1,103 mgKOH/g Polyethyleneimine B (PEI) having a weight average molecular weight (Mw) of 1,800: available from Nippon Shokubai Co., Ltd., product name: SP018, an amine value: 1,316 mgKOH/g Polyethyleneimine C (PEI) having a weight average molecular weight (Mw) of 1,500): available from Nippon Shokubai Co., Ltd., product name: SP015, an amine value: 1,377 mgKOH/g Polyallylamine A (PAA) having a weight average molecular weight (Mw) of 8,000: available from Nittobo Medical Company, product name: PAA-08, an amine value: 1,032 mgKOH/g Polyallylamine B (PAA) having a weight average molecular weight (Mw) of 1,600: available from Nittobo Medical Company, product name: PAA-01, an amine value: 1,238 mgKOH/g Polyallylamine C (PAA) having a weight average molecular weight (Mw) of 1,200 was obtained by decomposing the polyallylamine B having a weight average molecular weight of 1,600 (PAA, available from Nittobo Medical Company, product name: PAA-01) with an ultrasonic device, an amine value: 1,314 mgKOH/g Polyacrylic acid D (PAA) having a weight average molecular weight (Mw) of 10,000 was obtained by decomposing the polyacrylic acid A having a weight average molecular weight (Mw) of 800,000 (PAA, available from Nippon Shokubai Co., Ltd., product name: AS-58) with an ultrasonic device, an amine value: 0 mgKOH/g Polyacrylamide (PAAm) having a weight average molecular weight (Mw) of 10,000: available from Polysciences Inc., an amine value: 274 mgKOH/g Polyurethane (PU) having a weight average molecular weight (Mw) of 5,000 was synthesized in-house, a weight average molecular weight: 5,000, an amine value: 281 mgKOH/g Polyvinylpyrrolidone (PVP) having a weight average molecular weight (Mw) of 1,500: available from Nippon Shokubai Co., Ltd., product name: K-30, an amine value: 306 mgKOH/g 4-(4,6-Dimethoxy-1,3,5-triazin-2-yl)-4-methylmorpholinium=chloride n-hydrate: available from Wako Pure Chemical Industries, Ltd.

Preparation Example 1 of Third Liquid Material for Forming Three-Dimensional Object <Preparation of Third Liquid Material for Forming Three-Dimensional Object 1>

Water (89.0 parts by mass), sodium hydroxide (available from Wako Pure Chemical Industries, Ltd.) (10.0 parts by mass), and TWEEN 20 as a surfactant (available from Tokyo Chemical Industry Co., Ltd.) (1.0 part by mass) were subjected to dispersion treatment for 30 minutes using a homomixer, to prepare a third liquid material for forming a three-dimensional object 1.

Preparation Examples 2 to 5 of Third Liquid Material for Forming Three-dimensional Object Preparation of Third Liquid Materials for Forming Three-Dimensional Object 2 to 5

Third liquid materials for forming a three-dimensional object 2 to 5 were obtained in the same manner as in Preparation example 1 of third liquid material for forming three-dimensional object, except that unlike in Preparation example 1 of third liquid material for forming three-dimensional object, the compositions and contents were changed to as presented in Table 8 below.

The compositions and contents of the third liquid materials for forming a three-dimensional object 1 to 5 are presented in Table 8 below.

TABLE 8

|  |  | Third liquid material for forming three-dimensional object | | | | |
|---|---|---|---|---|---|---|
|  |  | 1 | 2 | 3 | 4 | 5 |
| Alkali metal | Sodium hydroxide | 10.0 | — | — | 10.0 | — |
|  | Potassium hydroxide | — | 10.0 | — | — | — |
|  | Lithium hydroxide | — | — | 10.0 | — | — |
|  | Hydrochloric acid | — | — | — | — | 10.0 |
| Surfactant | TWEEN 20 | 1.0 | 1.0 | 1.0 | — | — |
|  | Sodium dodecyl sulfate | — | — | — | 1.0 | — |
|  | Pure water | 89.0 | 89.0 | 89.0 | 89.0 | 90.0 |

Example 1

With a material set for forming a three-dimensional object 1 including the first liquid material for forming a three-dimensional object (slurry material) 1, the second liquid material for forming a three-dimensional object 1, and the third liquid material for forming a three-dimensional object 1 that were obtained above, a three-dimensional object (laminated object) 1 was produced in the manner described in (1) to (3) below, using a shape printing pattern having a size of 70 mm in length and 12 mm in width.

(1) First, using a three-dimensional object producing apparatus as illustrated in FIG. 1, the slurry material 1 was moved from the supplying-side slurry storing tank to the forming-side slurry storing tank, to form a thin layer formed of the slurry material 1 and having an average thickness of 100 micrometers on the support.

(2) Next, the second liquid material for forming a three-dimensional object 1 was applied (discharged) from nozzles to the surface of the thin layer formed of the slurry material 1, using an inkjet printer (available from Ricoh Company, Ltd., SG7100), to harden the slurry material 1.

(3) The operations of (1) and (2) were repeated in order for hardened thin layers formed of the slurry material 1 to be sequentially laminated until the total average thickness became a predetermined thickness of 3 mm, to obtain a hardened product. The obtained hardened product was left to stand at normal temperature for drying and for volatilization of the solvent, to produce a three-dimensional object 1. The obtained three-dimensional object 1 was immersed in the third liquid material for forming a three-dimensional object 1, in order for any unhardened slurry material component to be removed. As a result, no shape collapse occurred. The three-dimensional object 1 were excellent in strength and dimensional precision.

Examples 2 to 37 and Comparative Examples 1 to 7

Three-dimensional objects 2 to 37 were produced in the same manner as in Example 1, except that unlike in Example 1, the first liquid materials for forming a three-dimensional object, the second liquid materials for forming a three-dimensional object, and the third liquid materials for forming a three-dimensional object were combined as presented in Table 9 and Table 10 below to form material sets for forming a three-dimensional object 2 to 37.

<Dimensional Precision>

Next, the obtained three-dimensional objects were visually observed to evaluate dimensional precision according to the evaluation criteria described below. The results are presented in Table 9 and Table 10 below.

[Evaluation Criteria]

B: The obtained three-dimensional object was in a state that the surface was smooth, beautiful, and not warped.

C: The obtained three-dimensional object was in a state that the surface was slightly distorted and warped.

D: The obtained three-dimensional object was in a state that the surface was distorted and severely warped.

After the evaluation of dimensional precision, the three-dimensional objects obtained in (3) above were subjected to sintering treatment in the manner described in (4) below, to produce sintered bodies of the three-dimensional objects after sintering.

(4) The three-dimensional objects of Examples 1 to 8 and Examples 14 to 37 in which zirconia particles were used as inorganic particles were subjected to sintering treatment in a sintering furnace under an air environment at 1,500 degrees C.

The three-dimensional objects of Example 9 and Example 12 in which lithium disilicate particles were used as inorganic particles were subjected to sintering treatment under an air environment at 900 degrees C.

The three-dimensional objects of Example 10 and Example 13 in which titanium particles were used as inorganic particles were subjected to sintering treatment under a vacuum environment at 1,100 degrees C.

The three-dimensional object of Example 11 in which silicon nitride particles were used as inorganic particles was subjected to sintering treatment under a vacuum environment at 1,850 degrees C.

The sintered bodies of these three-dimensional objects were completely integrated structures and did not undergo, for example, breakage even when slammed on a hard floor.

<Bending Strength after Sintering or Proof Stress, Rockwell Hardness after Sintering, Density after Sintering, and Sinterability>

Next, sinterability, Rockwell hardness after sintering, and density after sintering of the obtained sintered bodies of the three-dimensional objects after sintering were evaluated in the manner described below according to the criterial described below. The results are presented in Table 9 and Table 10 below.

(Bending Strength after Sintering or Proof Stress)

For the three-dimensional objects formed of ceramic particles (zirconia particles, lithium disilicate particles, and silicon nitride particles), "bending strength after sintering" was measured according to ISO-6871 as bending strength, and for the three-dimensional objects formed of metal particles (titanium particles), "proof stress" was measured according to JIS-T6123, to measure bending strength after sintering or proof stress. For the measurement, AUTO-GRAPH-AGS-J available from Shimadzu Corporation was used.

From the measurement results of bending strength after sintering and proof stress, "sinterability" of the three-dimensional objects was evaluated according to the evaluation criteria described below. The results are presented in Table 9 and Table 10 below.

[Evaluation Criteria when Zirconia Particles were Used]
  B: The bending strength after sintering was 800 MPa or greater.
  C: The bending strength after sintering was 400 MPa or greater but less than 800 MPa.
  D: The bending strength after sintering was less than 400 MPa.

[Evaluation Criteria when Lithium Disilicate Particles were Used]
  B: The bending strength after sintering was 350 MPa or greater.
  C: The bending strength after sintering was 200 MPa or greater but less than 350 MPa.
  D: The bending strength after sintering was less than 200 MPa.

[Evaluation Criteria when Titanium Particles were Used]
  B: The proof stress was 400 MPa or greater.
  C: The proof stress was 240 MPa or greater but less than 400 MPa.
  D: The proof stress was less than 240 MPa.

[Evaluation Criteria when Silicon Nitride Particles were Used]
  B: The bending strength after sintering was 600 MPa or greater.
  C: The bending strength after sintering was 500 MPa or greater but less than 600 MPa.
  D: The bending strength after sintering was less than 500 MPa.

(Rockwell Hardness after Sintering)

For the three-dimensional objects formed of ceramic particles (zirconia particles, lithium disilicate particles, and silicon nitride particles) and metal particles (titanium particles), Rockwell hardness was measured according to JIS-Z-2245, to measure "Rockwell hardness after sintering". For the measurement, HR-110MR available from Mitutoyo Corporation was used.

From the measurement results of Rockwell hardness after sintering, sinterability of the three-dimensional objects was evaluated according to the evaluation criteria described below. The results are presented in Table 9 and Table 10 below.

[Evaluation Criteria when Zirconia Particles were Used]
  B: The Rockwell hardness after sintering was 80 HRA or greater.
  C: The Rockwell hardness after sintering was 70 HRA or greater but less than 80 HRA.
  D: The Rockwell hardness after sintering was less than 70 HRA.

[Evaluation Criteria when Lithium Disilicate Particles were Used]
  B: The Rockwell hardness after sintering was 60 HRA or greater.
  C: The Rockwell hardness after sintering was 50 HRA or greater but less than 60 HRA.
  D: The Rockwell hardness after sintering was less than 50 HRA.

[Evaluation Criteria when Titanium Particles were Used]
  B: The Rockwell hardness after sintering was 60 HRA or greater.
  C: The Rockwell hardness after sintering was 50 HRA or greater but less than 60 HRA.
  D: The Rockwell hardness after sintering was less than 50 HRA.

[Evaluation Criteria when Silicon Nitride Particles were Used]
  B: The Rockwell hardness after sintering was 50 HRA or greater.
  C: The Rockwell hardness after sintering was 45 HRA or greater but less than 50 HRA.
  D: The Rockwell hardness after sintering was less than 45 HRA.

(Density after Sintering)

For the three-dimensional objects formed of ceramic particles (zirconia particles, lithium disilicate particles, and silicon nitride particles) and metal particles (titanium particles), density after sintering was measured according to JIS-R-1634, to measure "density". For the measurement, AD-1653 available from A&D Company, Limited was used.

From the measurement results of density after sintering, sinterability of the three-dimensional objects was evaluated according to the evaluation criteria described below.

[Evaluation Criteria]
  B: The density after sintering was 93% or higher.
  C: The density after sintering was 88% or higher but lower than 93%.
  D: The density after sintering was lower than 88%.

TABLE 9

| | | First liquid material for forming 3D object | Second liquid material for forming 3D object | Third liquid material for forming 3D object | Evaluation results | | | | | |
|---|---|---|---|---|---|---|---|---|---|---|
| | | | | | Bending strength after sintering or proof stress (MPa) | Rockwell hardness after sintering (HRA) | Density after sintering (%) | Sinterability | Bio-compatibility | Dimensional precision |
| Ex. | 1 | 1 | 1 | 1 | 1,025 | 86 | 99 | B | B | B |
| | 2 | 2 | 1 | 1 | 985 | 84 | 97 | B | B | C |
| | 3 | 3 | 1 | 1 | 990 | 83 | 99 | B | B | B |
| | 4 | 4 | 1 | 1 | 1,038 | 84 | 99 | B | B | B |
| | 5 | 5 | 1 | 1 | 936 | 84 | 96 | B | B | B |
| | 6 | 1 | 2 | 1 | 942 | 84 | 99 | B | B | B |
| | 7 | 1 | 3 | 1 | 986 | 86 | 99 | B | B | B |
| | 8 | 1 | 4 | 1 | 913 | 84 | 97 | B | B | B |
| | 9 | 6 | 1 | 1 | 386 | 62 | 99 | B | B | B |
| | 10 | 7 | 1 | 1 | 435 | 63 | 98 | B | B | B |
| | 11 | 8 | 1 | 1 | 899 | 91 | 98 | B | C | B |
| | 12 | 9 | 1 | 1 | 297 | 62 | 96 | B | B | B |
| | 13 | 10 | 1 | 1 | 338 | 64 | 94 | B | B | B |
| | 14 | 11 | 1 | 1 | 864 | 84 | 96 | B | B | B |
| | 15 | 12 | 1 | 1 | 1,048 | 85 | 99 | B | B | B |
| | 16 | 13 | 1 | 1 | 1,026 | 82 | 99 | B | B | B |
| | 17 | 14 | 1 | 1 | 992 | 88 | 99 | B | B | C |
| | 18 | 1 | 5 | 1 | 937 | 86 | 98 | B | B | C |
| | 19 | 1 | 6 | 1 | 910 | 85 | 96 | B | B | C |
| | 20 | 15 | 1 | 1 | 1,042 | 86 | 98 | B | B | C |
| | 21 | 16 | 1 | 1 | 925 | 86 | 93 | C | B | B |
| | 22 | 17 | 1 | 1 | 271 | 83 | 94 | C | B | B |
| | 23 | 18 | 1 | 1 | 306 | 80 | 93 | C | B | B |
| | 24 | 19 | 1 | 1 | 860 | 85 | 96 | C | B | B |
| | 25 | 20 | 1 | 1 | 1,062 | 84 | 98 | B | B | C |
| | 26 | 21 | 1 | 1 | 918 | 88 | 99 | B | B | C |
| | 27 | 1 | 7 | 1 | 992 | 86 | 98 | B | B | C |
| | 28 | 1 | 8 | 1 | 846 | 86 | 97 | C | B | C |
| | 29 | 1 | 9 | 1 | 1,034 | 84 | 96 | B | B | B |
| | 30 | 1 | 10 | 1 | 1,027 | 85 | 97 | B | B | B |
| | 31 | 1 | 11 | 1 | 1,039 | 83 | 94 | B | B | C |
| | 32 | 1 | 12 | 1 | 1,006 | 86 | 96 | B | B | C |
| | 33 | 1 | 13 | 1 | 1,014 | 84 | 94 | B | B | C |
| | 34 | 1 | 14 | 1 | 977 | 84 | 95 | B | B | C |
| | 35 | 1 | 1 | 2 | 1,011 | 86 | 94 | B | B | B |
| | 36 | 1 | 1 | 3 | 1,038 | 85 | 97 | B | B | B |
| | 37 | 1 | 1 | 4 | 1,031 | 83 | 96 | B | B | B |

TABLE 10

| | | First liquid material for forming 3D object | Second liquid material for forming 3D object | Third liquid material for forming 3D object | Evaluation results | | | | | |
|---|---|---|---|---|---|---|---|---|---|---|
| | | | | | Bending strength after sintering (MPa) | Rockwell hardness after sintering (HRA) | Density after sintering (%) | Sinterability | Bio-compatibility | Dimensional precision |
| Comp. Ex. | 1 | 22 | 1 | 1 | — | — | — | — | — | D |
| | 2 | 23 | 1 | 1 | — | — | — | — | — | D |
| | 3 | 1 | 15 | 1 | — | — | — | — | — | D |
| | 4 | 1 | — | 1 | — | — | — | — | — | D |
| | 5 | 1 | 16 | 1 | — | — | — | — | — | D |
| | 6 | 1 | 17 | 1 | — | — | — | — | — | D |
| | 7 | 22 | 1 | 5 | — | — | — | — | — | D |

Example 38

A three-dimensional object 38 was obtained in the same manner as in Example 1, except that unlike in Example 1, the slurry material 1 was changed to the slurry material 3, the second liquid material for forming a three-dimensional object 1 was changed to the second liquid material for forming a three-dimensional object 18, and the third liquid material for forming a three-dimensional object 1 was not used to form a material set for forming a three-dimensional object 38, and (3) in (1) to (4) of the production of the three-dimensional object 1 was changed to (3') described below.

(3') The operations of (1) and (2) were repeated in order for hardened thin layers formed of the slurry material 3 to be sequentially laminated until the total average thickness became a predetermined thickness of 3 mm, to obtain a three-dimensional object, which was a green body. The three-dimensional object, which was a green body, was heated with a hot plate at 150 degrees C. for 15 minutes, to obtain a three-dimensional object, which was a green body. The obtained three-dimensional object, which was a green body, was immersed in highly pure water at 25 degrees C. for 30 minutes and taken out. The water on the surface was removed with KIMTOWEL, to remove any unhardened slurry material component. Because the three-dimensional object had both of hardness and flexibility, it was possible to take out the three-dimensional object without shape deformation such as chipping.

Examples 39 to 48

Three-dimensional objects 39 to 48 were produced in the same manner as in Example 38, except that unlike in Example 38, the first liquid materials for forming a three-dimensional object and the second liquid materials for forming a three-dimensional object were combined as presented in Table 11 below to form material sets for forming a three-dimensional object 39 to 48.
[Confirmation of Novel Covalent Bonds Between Organic Compound A and Organic Compound B]

For confirmation of novel covalent bonds between the organic compound A and the organic compound B, a measurement was performed using a high solid resolution $^{13}C$-NMR (instrument name: ECX-500 NMR, available from JEOL Ltd.) spectrum. As a result, from the measurement of the green bodies, it was possible to confirm that novel covalent bonds were formed between the organic compound A and the organic compound B in these Examples.
—Measurement Conditions—
  Cumulative number of times: 40,000 times
  C.T.=2 msec
  SW=240 ppm
  Offset=110 ppm
  Rotation=16 kHz (127.2 ppm)
  X amp CP=52.7%
  X amp grad=22.0%
—Measurement Samples—
  Organic compound A alone
  Organic compound B alone
  A sample obtained by mixing the organic compound A and the organic compound B at a ratio by mole of 1:1 in highly pure water and drying the resultant in a thermostat bath at 50 degrees C. for 24 hours
  A sample obtained by mixing the organic compound A, the organic compound B, and a condensation agent at a ratio by mole of 1:1:1 in highly pure water and drying the resultant in a thermostat bath at 50 degrees C. for 24 hours
  A sample obtained by mixing the organic compound A and the organic compound B at a ratio by mole of 1:1 in highly pure water and heating the resultant with a hot plate at 150 degrees C.

Next, the three-dimensional objects, which were green bodies obtained in (3') above, were used for evaluation of "hardness of hardened portion before sintering", "bend elastic constant before sintering", "bending strength after sintering", and "dimensional precision after sintering" in the manners described below. The results are presented in Table 11 below.
(Hardness of Hardened Portion Before Sintering)

There was a need for removing any unhardened slurry component by immersing each three-dimensional object, which was a green body, in water. Here, there was a need that the portion hardened with the second liquid material for forming a three-dimensional object maintain a certain degree of hardness when immersed in water. The hardness of the hardened portion of each obtained three-dimensional object, which was a green body, was measured with a micro rubber hardness tester (instrument name: MD-1 CAPA, available from Asker), to evaluate "hardness of hardened portion before sintering" according to the evaluation criteria described below. The measurement was started in a state that the sample was put on a table and the indenter was brought to a position that was about 15 mm from the sample.
—Evaluation Criteria—
  A: 60 degrees or greater
  B: 45 degrees or greater but less than 60 degrees
  C.: 30 degrees or greater but less than 45 degrees
  D: Less than 30 degrees Each three-dimensional object, which was a green body, was immersed in highly pure water at 25 degrees C., to perform hardness measurement and a separating step. A three-dimensional object sample having a hardness of less than 30 degrees would easily be deformed by a physical force in the separating step, and it would be difficult to obtain the sample as a desired shape.
(Bend Elastic Constant Before Sintering)

A three-point bending strength was measured with AUTOGRAPH-AG-1 (available from Shimadzu Corporation). The dimensions of each three-dimensional object, which was a green body, were measured with a pair of Vernier calipers to set the distance between supporting points to 24 mm. The measurement was performed at a head stroke speed of 0.02 mm/s, to evaluate "bend elastic constant before sintering" according to the evaluation criteria described below. The bend elastic constant was calculated according to the formula below.

$$E=(Lv^3 \times m)/(4 \times W \times h^3)$$

E: bend elastic constant [kgf/mm$^2$]
Lv: distance between supporting points [mm]
W: width of test piece [mm]
h: height of test piece [mm]
m: slope of a straight line portion of a load-deflection curve [kgf/mm]
—Evaluation Criteria—
  B: The bend elastic constant was less than 500 Pa.
  C: The bend elastic constant was 500 Pa or greater but less than 2,000 Pa.
  D: The bend elastic constant was 2,000 Pa or greater.

Each three-dimensional object sample was immersed in pure water at 25 degrees C. to perform bend elastic constant measurement and a separating step. When a three-dimensional object sample had a hardness of 2,000 Pa or greater, even the three-dimensional object was partially chipped simultaneously by a superfluous physical force in the separating step, and it was difficult to obtain the sample as a desired shape.
(Bending Strength after Sintering)

For the bending strength after sintering, a bending strength after sintering was measured in the same manner as measuring the bending strength after sintering in Example 1, to evaluate "bending strength after sintering" according to the evaluation criteria for bending strength after sintering in Example 1 when zirconia particles were used.
(Dimensional Precision After Sintering)

Next, "dimensional precision after sintering" of the obtained three-dimensional objects after sintering was evaluated in the same manner as in Example 1.

TABLE 11

|    | First liquid material for forming 3D object | Second liquid material for forming 3D object | Heating temperature (degree C.) | Hardness of hardened portion before sintering | Bend elastic constant before sintering | Bending strength after sintering | Dimensional precision after sintering |
|---|---|---|---|---|---|---|---|
| Ex. 38 | 3  | 18 | 150 | A | B | B | B |
| 39 | 3  | 18 | 25  | B | B | B | B |
| 40 | 24 | 2  | 150 | A | B | B | B |
| 41 | 24 | 2  | 25  | B | B | B | B |
| 42 | 3  | 2  | 100 | B | B | B | B |
| 43 | 3  | 2  | 200 | A | B | B | B |
| 44 | 25 | 19 | 200 | B | B | B | B |
| 45 | 26 | 2  | 200 | B | B | B | B |
| 46 | 3  | 2  | 25  | C | B | B | C |
| 47 | 3  | 2  | 90  | C | B | B | C |
| 48 | 3  | 2  | 250 | A | C | B | C |

Preparation Example 27 of First Liquid Material for Forming Three-Dimensional Object (Slurry Material)

<Preparation of First Liquid Material for Forming Three-Dimensional Object (Slurry Material) 27>

The inorganic particles 1 (zirconia particles) (30.0 parts by mass), polyethylene oxide having a weight average molecular weight (Mw) of 80,000 (PEO, available from Meisei Chemical Works, Ltd., ALKOX L-8) as the organic compound A (5.0 parts by mass), benzylbutyl phthalate as a plasticizer (10.0 parts by mass), a dispersant for ceramics (MALIALIM, available from NOF Corporation, AKM-0531) (1.5 parts by mass), ethanol (48.5 parts by mass), and glycerin as polyvalent alcohol (available from Wako Pure Chemical Industries, Ltd.) (5.0 parts by mass) were mixed, and subjected to dispersion treatment for 3 hours using a bead mill with zirconia beads having a diameter of 3 mm, to obtain a first liquid material for forming a three-dimensional object 27.

The volume average particle diameter of the inorganic particles in the obtained first liquid material for forming a three-dimensional object (slurry material) 27 was measured in the same manner as measuring the volume average particle diameter of the inorganic particles in Preparation example 1 of first liquid material for forming three-dimensional object (slurry material).

Preparation Examples 28 to 40 of First Liquid Material for Forming Three-Dimensional Object (Slurry Material)

<Preparation of First Liquid Materials for Forming Three-Dimensional Object (Slurry Materials) 28 to 40>

First liquid materials for forming a three-dimensional object (slurry materials) 28 to 40 were obtained in the same manner as in Preparation example 27 of first liquid material for forming three-dimensional object (slurry material), except that unlike in Preparation example 27 of first liquid material for forming three-dimensional object (slurry material), the compositions and contents were changed as presented in Table 12 and Table 13 below. The volume average particle diameter of the inorganic particles was measured in the same manner as measuring the volume average particle diameter of the inorganic particles in Preparation example 1 of first liquid material for forming three-dimensional object (slurry material).

The compositions of the first liquid materials for forming a three-dimensional object (slurry materials) 27 to 40 and the volume average particle diameter of the inorganic particles are presented in Table 12 and Table 13 below.

TABLE 12

|  |  | First liquid material for forming three-dimensional object | | | | | | | | | | |
|---|---|---|---|---|---|---|---|---|---|---|---|
|  |  | 27 | 28 | 29 | 30 | 31 | 32 | 33 | 34 | 35 | 36 | 37 |
| Inorganic particles | Zirconia particles | 30.0 | 30.0 | 30.0 | 30.0 | 30.0 | — | — | 30.0 | 30.0 | 30.0 | 30.0 |
|  | Lithium disilicate particles | — | — | — | — | — | 30.0 | — | — | — | — | — |
|  | Titanium particles | — | — | — | — | — | — | 30.0 | — | — | — | — |
| Organic compound A | Polyethylene oxide (weight average molecular weight: 80,000) | 5.0 | 5.0 | 5.0 | 5.0 | 5.0 | 5.0 | 5.0 | — | — | — | — |
|  | Polyethyleneimine D (weight average molecular weight: 70,000) | — | — | — | — | — | — | — | 12.0 | — | — | — |
|  | Polyacrylic acid A (weight average molecular weight: 800,000) | — | — | — | — | — | — | — | — | 5.0 | — | — |
|  | Polyacrylic acid B (weight average molecular weight: 400,000) | — | — | — | — | — | — | — | — | — | 5.0 | — |
|  | Polyacrylic acid C (weight average molecular weight: 300,000) | — | — | — | — | — | — | — | — | — | — | 5.0 |

TABLE 12-continued

|  |  |  | First liquid material for forming three-dimensional object | | | | | | | | | | |
|---|---|---|---|---|---|---|---|---|---|---|---|---|---|
|  |  |  | 27 | 28 | 29 | 30 | 31 | 32 | 33 | 34 | 35 | 36 | 37 |
| Solvent | Polyvalent alcohol | Glycerin | 5.0 | — | — | — | — | 5.0 | 5.0 | 5.0 | 5.0 | 5.0 | 5.0 |
|  |  | 1,2-hexanediol | — | 5.0 | — | — | — | — | — | — | — | — | — |
|  |  | Ethylene glycol | — | — | 5.0 | — | — | — | — | — | — | — | — |
|  |  | 3-methyl-1,3-butanediol | — | — | — | 5.0 | — | — | — | — | — | — | — |
|  |  | 1,2-propanediol | — | — | — | — | 5.0 | — | — | — | — | — | — |
|  | Other solvents | Ethanol | 48.5 | 48.5 | 48.5 | 48.5 | 48.5 | 48.5 | 48.5 | 41.5 | 48.5 | 48.5 | 48.5 |
| Plasticizer |  | Benzylbutyl phthalate | 10.0 | 10.0 | 10.0 | 10.0 | 10.0 | 10.0 | 10.0 | 10.0 | 10.0 | 10.0 | 10.0 |
| Dispersant |  | Dispersant for ceramics | 1.5 | 1.5 | 1.5 | 1.5 | 1.5 | 1.5 | 1.5 | 1.5 | 1.5 | 1.5 | 1.5 |
|  | Total (% by mass) |  | 100 | 100 | 100 | 100 | 100 | 100 | 100 | 100 | 100 | 100 | 100 |
|  | Content (part by mass) of organic compound A relative to 100 parts by mass of inorganic particles |  | 16.7 | 16.7 | 16.7 | 16.7 | 16.7 | 16.7 | 16.7 | 40.0 | 16.7 | 16.7 | 16.7 |
|  | Volume average particle diameter (micrometer) of inorganic particles |  | 0.15 | 0.15 | 0.15 | 0.15 | 0.15 | 0.15 | 0.15 | 0.15 | 0.15 | 0.15 | 0.15 |

TABLE 13

|  |  |  | First liquid material for forming three-dimensional object | | |
|---|---|---|---|---|---|
|  |  |  | 38 | 39 | 40 |
| Inorganic particles | Zirconia particles |  | 30.0 | 30.0 | 30.0 |
|  | Lithium disilicate particles |  | — | — | — |
|  | Titanium particles |  | — | — | — |
| Organic compound A | Polyethylene oxide (weight average molecular weight: 80,000) |  | — | — | 5.0 |
|  | Polyethyleneimine D (weight average molecular weight: 70,000) |  | — | — | — |
|  | Polyacrylic acid A (weight average molecular weight: 800,000) |  | 1.5 | 9.0 | — |
|  | Polyacrylic acid B (weight average molecular weight: 400,000) |  | — | — | — |
|  | Polyacrylic acid C (weight average molecular weight: 300,000) |  | — | — | — |
| Solvent | Polyvalent alcohol | Glycerin | 5.0 | 5.0 | — |
|  |  | 1,2-hexanediol | — | — | — |
|  |  | Ethylene glycol | — | — | — |
|  |  | 3-methyl-1,3-butanediol | — | — | — |
|  |  | 1,2-propanediol | — | — | — |
|  | Other solvents | Ethanol | 52.0 | 44.5 | 53.5 |
| Plasticizer |  | Benzylbutyl phthalate | 10.0 | 10.0 | 10.0 |
| Dispersant |  | Dispersant for ceramics | 1.5 | 1.5 | 1.5 |
|  | Total (% by mass) |  | 100 | 100 | 100 |
|  | Content (part by mass) of organic compound A relative to 100 parts by mass of inorganic particles |  | 5.0 | 30.0 | 16.7 |
|  | Volume average particle diameter (micrometer) of inorganic particles |  | 0.15 | 0.15 | 0.15 |

Product names and supplier names of the components in Table 12 and Table 13 above are as follows.

Polyethylene oxide (PEO) having a weight average molecular weight (Mw) of 800,000: available from Meisei Chemical Works, Ltd., product name: ALKOX L-8

Polyethyleneimine D (PEI) having a weight average molecular weight (Mw) of 70,000: available from Nippon Shokubai Co., Ltd., product name: SP-1000

Polyacrylic acid A (PAA) having a weight average molecular weight (Mw) of 800,000: available from Nippon Shokubai Co., Ltd., product name: AS-58

Polyacrylic acid B (PAA) having a weight average molecular weight (Mw) of 400,000: the polyacrylic acid B (PAA) having a weight average molecular weight of 400,000 was obtained by decomposing the polyacrylic acid A (PAA) with an ultrasonic device.
Polyacrylic acid C (PAA) having a weight average molecular weight (Mw) of 300,000: the polyacrylic acid C (PAA) having a weight average molecular weight of 300,000 was obtained by decomposing the polyacrylic acid A (PAA) with an ultrasonic device.
Lithium disilicate particles: a synthesized product
Titanium particles: available from OSAKA Titanium Technologies, with bio-compatibility Preparation Example 20 of Second Liquid Material for Forming Three-Dimensional Object <Preparation of Second Liquid Material for Forming Three-Dimensional Object 20>

Water (94.5 parts by mass), polyethylene oxide having a weight average molecular weight (Mw) of 80,000 (PEO, product name: ALKOX L-8, available from Meisei Chemical Works, Ltd.) as the organic compound B (5.0 parts by mass), and TWEEN 20 (Polyoxyethylene (20) sorbitan monolaurate, available from Ficher-Scientific) as a surfactant (0.5 parts by mass) were subjected to dispersion treatment for 30 minutes using a homomixer, to prepare a second liquid material for forming a three-dimensional object 20.

Preparation Example 21 of Second Liquid Material for Forming Three-Dimensional Object <Preparation of Second Liquid Material for Forming Three-Dimensional Object 21>

Water (74.5 parts by mass), polyethylene oxide (product name: ALKOX L-8, available from Meisei Chemical Works, Ltd.) as the organic compound B (5.0 parts by mass), 1,2-hexanediol as a polyvalent alcohol (20.0 part by mass), and TWEEN 20 (Polyoxyethylene (20) sorbitan monolaurate, available from Ficher-Scientific) as a surfactant (0.5 parts by mass) were subjected to dispersion treatment for 30 minutes using a homomixer, to prepare a second liquid material for forming a three-dimensional object 21.

Preparation Examples 22 to 33 of Second Liquid Material for Forming Three-Dimensional Object <Preparation of Second Liquid Materials for Forming Three-Dimensional Objects 22 to 33>

Second liquid materials for forming a three-dimensional object 22 to 33 were obtained in the same manner as in Preparation example 21 of second liquid material for forming a three-dimensional object, except that unlike in Preparation example 21 of second liquid material for forming a three-dimensional object, the compositions and contents were changed as presented in Table 14 below.

The compositions and contents of the second liquid materials for forming a three-dimensional object 20 to 33 are presented in Table 14 below.

TABLE 14

| | | Second liquid material for forming three-dimensional object | | | | | | | | | | | | | |
|---|---|---|---|---|---|---|---|---|---|---|---|---|---|---|---|
| | | 20 | 21 | 22 | 23 | 24 | 25 | 26 | 27 | 28 | 29 | 30 | 31 | 32 | 33 |
| Organic compound B | Polyethylene oxide (weight average molecular weight: 80,000) | 5.0 | 5.0 | 5.0 | — | — | — | — | — | — | — | — | — | — | — |
| | Polyacrylic acid D (weight average molecular weight: 10,000) | — | — | — | 5.0 | — | — | — | — | — | — | — | — | — | — |
| | Polyethyleneimine A (weight average molecular weight: 10,000) | — | — | — | — | 12.0 | 12.0 | 12.0 | — | — | — | 3.0 | 20.0 | 2.5 | 25.0 |
| | Polyethyleneimine B (weight average molecular weight: 1,800) | — | — | — | — | — | — | — | 12.0 | — | — | — | — | — | — |
| | Polyethyleneimine C (weight average molecular weight: 1,500) | — | — | — | — | — | — | — | — | 12.0 | — | — | — | — | — |
| | Polyvinylpyrrolidone (weight average molecular weight: 10,000) | — | — | — | — | — | — | — | — | — | 12.0 | — | — | — | — |
| Solvent | Polyvalent alcohol 1,2-hexanediol | — | 20.0 | — | — | — | — | — | — | — | — | — | — | — | — |
| | Ethylene glycol | — | — | 20.0 | — | — | 20.0 | — | — | — | — | — | — | — | — |
| | 1,2-propanediol | — | — | — | 20.0 | 20.0 | — | — | 20.0 | 20.0 | 20.0 | 20.0 | 20.0 | 20.0 | 20.0 |
| | Glycerin | — | — | — | — | — | — | 20.0 | — | — | — | — | — | — | — |
| Surfactant | TWEEN 20 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Water | 94.5 | 74.5 | 74.5 | 74.5 | 67.5 | 67.5 | 67.5 | 67.5 | 67.5 | 67.5 | 76.5 | 59.5 | 77.0 | 54.5 |
| | Total (% by mass) | 100 | 100 | 100 | 100 | 100 | 100 | 100 | 100 | 100 | 100 | 100 | 100 | 100 | 100 |

Product names and supplier names of the components in Table 14 above are as follows.
Polyethylene oxide (PEO) having a weight average molecular weight (Mw) of 800,000: available from Meisei Chemical Works, Ltd., product name: ALKOX L-8
Polyacrylic acid D (PAA) having a weight average molecular weight (Mw) of 10,000 was obtained by decomposing the polyacrylic acid A having a weight average molecular weight (Mw) of 800,000 (PAA, available from Nippon Shokubai Co., Ltd., product name: AS-58) with an ultrasonic device, with an amine value of 0 mgKOH/g
Polyethyleneimine A (PEI) having a weight average molecular weight (Mw) of 10,000: available from Nippon Shokubai Co., Ltd., product name: SP-200

Polyethyleneimine B (PEI) having a weight average molecular weight (Mw) of 1,800: available from Nippon Shokubai Co., Ltd., product name: SP-018

Polyethyleneimine C (PEI) having a weight average molecular weight (Mw) of 1,500: available from Nippon Shokubai Co., Ltd., product name: SP-015

Polyvinylpyrrolidone (PVP) having a weight average molecular weight (Mw) of 10,000: available from Nippon Shokubai Co., Ltd., product name: K-30

Example 49

With a material set for forming a three-dimensional object 49 obtained by changing the slurry material 1 to the slurry material 27 and the second liquid material for forming a three-dimensional object 1 to the second liquid material for forming a three-dimensional object 20 in Example 1, a three-dimensional object (laminated object) 49 was produced in the manner described in (5) to (7) below, using a shape printing pattern having a size of 70 mm in length and 12 mm in width.

(5) First, using a three-dimensional object producing apparatus as illustrated in FIG. 1, the slurry material 27 was moved from the supplying-side slurry storing tank to the forming-side slurry storing tank by a doctor blade (product name: MULTI APPLICATOR, available from Byk-Gardner GMBH) serving as a layer forming member, to form a thin layer formed of the slurry material 27 and having an average thickness of 100 micrometers on the support.

After moving of the slurry, the doctor blade was immersed in a tank filled with water of 25 degrees C. for 15 seconds or longer, and then the slurry attached on the doctor blade was wiped off with a paper wipe (product name: KIM-TOWEL, available from Nippon Paper Crecia Co., Ltd.).

(6) Next, the second liquid material for forming a three-dimensional object 20 was applied (discharged) from nozzles to the surface of the thin layer formed of the slurry material 27, using an inkjet printer (available from Ricoh Company, Ltd., SG3100KE), to harden the slurry material 27.

(7) The operations of (5) and (6) were repeated in order for hardened thin layers formed of the slurry material 27 to be sequentially laminated until the total average thickness became a predetermined thickness of 3 mm, to obtain a hardened product. The obtained hardened product was left to stand at normal temperature for drying and for volatilization of the solvent, to produce a three-dimensional object 49. The obtained three-dimensional object 49 was immersed in water, in order for any unhardened slurry material component to be removed. As a result, no shape collapse occurred.

Examples 50 to 73

Three-dimensional objects were produced in the same manner as in Example 49, except that unlike in Example 49, the first liquid materials for forming a three-dimensional object and the second liquid materials for forming a three-dimensional object were combined as presented in Table 15 below to form material sets for forming a three-dimensional object 50 to 73.

<Removability of Adherent Matter on Layer Forming Member>

Next, the doctor blade was visually observed after 20 three-dimensional objects were formed continuously, to evaluate "removability of adherent matter on layer forming member" according to the evaluation criteria described below.

[Evaluation Criteria]
A: No adherent matter due to the slurry was observed.
B: Adherent matter due to the slurry was observed, and it was possible to remove the adherent matter by wiping once with a waste cloth impregnated with acetone.
D: Adherent matter due to the slurry was observed, and it was impossible to remove the adherent matter unless wiping with a waste cloth impregnated with acetone was performed twice or more times.

<Layer Driability>

Next, after the drying in (7) above, the hardened product was left to stand at normal temperature for 3 minutes. Subsequently, a paper sheet (product name: RECYCLE PAPER 100, available from Oji Paper Co., Ltd.) cut into a size of 4 cm on each of 4 sides was put on the surface of the layers, and a weight of 200 g (available from Satoshoji Co., Ltd.) was put on the paper sheet in a manner not to stick out from the sheet surface and pressed in this state for 30 seconds. Then, the paper sheet was removed. A weight change of the cut paper sheet was measured.

[Evaluation Criteria]
B: A weight increase was less than 0.25 g/cm$^2$.
D: A weight increase was 0.25 g/cm$^2$ or greater.

<Bending Strength of Green Body>

Next, the bending strength of the obtained green bodies (three-dimensional objects) was evaluated according to the criteria described below in the manner described below.

For the green bodies formed of ceramic particles (zirconia particles and lithium disilicate particles), "bending strength of green body" was measured according to ISO-6871, and for the green bodies formed of metal particles (titanium particles), "bending strength of green body" was measured according to JIS-T6123. For the measurement, AUTO-GRAPH-AGS-J available from Shimadzu Corporation was used.

From the measurement results of the bending strength of green body, "bending strength of green body" was evaluated according to the evaluation criteria described below. The results are presented in Table 15 below.

[Evaluation Criteria for Bending Strength of Green Body]
A: The bending strength of the green body was 400 MPa or greater.
B: The bending strength of the green body was 300 MPa or greater but less than 400 MPa.
C: The bending strength of the green body was less than 300 MPa.

TABLE 15

|     |    | First liquid material for forming 3D object | Second liquid material for forming 3D object | Evaluation results | | |
|-----|----|---|---|---|---|---|
|     |    |   |   | Removability of adherent matter on layer forming member | Layer driability | Bending strength of green body (MPa) |
| Ex. | 49 | 27 | 20 | B | B | C (266) |
|     | 50 | 28 | 20 | B | B | C (261) |

TABLE 15-continued

|  | First liquid material for forming 3D object | Second liquid material for forming 3D object | Removability of adherent matter on layer forming member | Layer driability | Bending strength of green body (MPa) |
|---|---|---|---|---|---|
| 51 | 29 | 20 | B | B | C (263) |
| 52 | 30 | 20 | B | B | C (264) |
| 53 | 31 | 20 | B | B | C (260) |
| 54 | 32 | 20 | B | B | C (203) |
| 55 | 33 | 20 | B | B | C (252) |
| 56 | 27 | 21 | A | B | C (262) |
| 57 | 27 | 22 | A | B | C (259) |
| 58 | 27 | 21 | A | B | C (258) |
| 59 | 34 | 23 | A | B | B (382) |
| 60 | 35 | 24 | A | B | A (498) |
| 61 | 35 | 25 | A | B | A (491) |
| 62 | 35 | 26 | A | B | A (449) |
| 63 | 36 | 24 | A | B | B (343) |
| 64 | 37 | 24 | A | B | C (281) |
| 65 | 38 | 24 | A | B | A (483) |
| 66 | 39 | 24 | A | B | A (479) |
| 67 | 35 | 27 | A | B | B (372) |
| 68 | 35 | 28 | A | B | C (269) |
| 69 | 35 | 29 | A | B | C (247) |
| 70 | 35 | 30 | A | B | A (481) |
| 71 | 35 | 31 | A | B | A (480) |
| 72 | 35 | 32 | A | B | B (363) |
| 73 | 35 | 33 | B | B | A (480) |

The parenthesized values in Table 15 above represents measured values of the bending strength of the green bodies.

From the results of Table 15 above, it can be seen that Examples 49 to 73 resulted in excellent removability of adherent matter on the layer forming member and excellent layer driability.

Aspects of the present disclosure are as follows, for example.

<1> A material set for forming a three-dimensional object, the material set including:
a first liquid material for forming a three-dimensional object; and
a second liquid material for forming a three-dimensional object,
wherein the first liquid material contains a solvent, an organic compound A, and inorganic particles, and
wherein the second liquid material contains an organic compound B having reactivity with the organic compound A.

<2> The material set for forming a three-dimensional object according to <1>, further including
a third liquid material for forming a three-dimensional object,
wherein the third liquid material dissolves the organic compound A.

<3> The material set for forming a three-dimensional object according to <1> or <2>,
wherein at least any one of the first liquid material for forming a three-dimensional object and the second liquid material for forming a three-dimensional object further contains a dehydration-condensation agent.

<4> The material set for forming a three-dimensional object according to any one of <1> to <3>,
wherein the organic compound A contains an acidic functional group, and
wherein the organic compound B contains a basic functional group.

<5> The material set for forming a three-dimensional object according to <4>,
wherein the acidic functional group is a carboxyl group, and
wherein the basic functional group is an amino group or an amide group.

<6> The material set for forming a three-dimensional object according to any one of <1> to <5>,
wherein an amine value of the second liquid material for forming a three-dimensional object is 100 mgKOH/g or greater.

<7> The material set for forming a three-dimensional object according to any one of <1> to <6>,
wherein the organic compound A is a polyacrylic acid.

<8> The material set for forming a three-dimensional object according to any one of <1> to <7>,
wherein a content of the organic compound A is 5 parts by mass or greater but 30 parts by mass or less relative to 100 parts by mass of the inorganic particles.

<9> The material set for forming a three-dimensional object according to any one of <1> to <8>,
wherein an amine value of the organic compound B is 300 mgKOH/g or greater but 1,500 mgKOH/g or less.

<10> The material set for forming a three-dimensional object according to any one of <1> to <9>,
wherein the organic compound B contains any one selected from the group consisting of a primary amino group, a secondary amino group, a tertiary amino group, and an amide group.

<11> The material set for forming a three-dimensional object according to any one of <1> to <10>,
wherein the organic compound B is at least one selected from the group consisting of polyethyleneimine, polyallylamine, polyacrylamide, and polyurethane.

<12> The material set for forming a three-dimensional object according to <11>,
wherein the organic compound B is at least any one selected from the group consisting of polyethyleneimine and polyallylamine.

<13> The material set for forming a three-dimensional object according to <12>,
wherein the polyethyleneimine is a branched type.
<14> The material set for forming a three-dimensional object according to any one of <11> to <13>,
wherein a weight average molecular weight of the polyallylamine is 1,600 or greater.
<15> The material set for forming a three-dimensional object according to any one of <1> to <14>,
wherein the organic compound B is water-soluble.
<16> The material set for forming a three-dimensional object according to any one of <1> to <15>,
wherein a content of the organic compound B is 3 parts by mass or greater but 20 parts by mass or less relative to 100 parts by mass of the second liquid material for forming a three-dimensional object.
<17> The material set for forming a three-dimensional object according to any one of <1> to <16>,
wherein the inorganic particles are at least one selected from the group consisting of ceramic particles and metal particles.
<18> The material set for forming a three-dimensional object according to any one of <1> to <17>,
wherein the inorganic particles have bio-compatibility.
<19> The material set for forming a three-dimensional object according to <17> or <18>,
wherein a density of a three-dimensional object after sintering is 93% or higher.
<20> The material set for forming a three-dimensional object according to any one of <17> to <19>,
wherein a volume average particle diameter of the ceramic particles in the first liquid material for forming a three-dimensional object is less than 5 micrometers.
<21> The material set for forming a three-dimensional object according to any one of <17> to <20>,
wherein the ceramic particles have at least any one of a bending strength after sintering of 1,500 MPa or greater and a Rockwell hardness of 80 HRA or greater.
<22> The material set for forming a three-dimensional object according to any one of <17> to <21>,
wherein a volume average particle diameter of the metal particles in the first liquid material for forming a three-dimensional object is less than 50 micrometers.
<23> The material set for forming a three-dimensional object according to any one of <1> to <22>,
wherein a content of the inorganic particles is 20 parts by mass or greater but 70 parts by mass or less relative to 100 parts by mass of the first liquid material for forming a three-dimensional object.
<24> The material set for forming a three-dimensional object according to any one of <2> to <23>,
wherein the third liquid material for forming a three-dimensional object contains a substance that forms a salt with the organic compound A.
<25> The material set for forming a three-dimensional object according to <24>,
wherein the substance that forms a salt with the organic compound A is a basic alkali metal hydroxide.
<26> The material set for forming a three-dimensional object according to <24> or <25>,
wherein the substance that forms a slat with the organic compound A is at least one selected from the group consisting of lithium hydroxide, sodium hydroxide, and potassium hydroxide.
<27> The material set for forming a three-dimensional object according to <25> or <26>,
wherein the third liquid material for forming a three-dimensional object contains a plurality of alkali metal hydroxides.
<28> The material set for forming a three-dimensional object according to any one of <2> to <27>,
wherein the third liquid material for forming a three-dimensional object further contains a surfactant.
<29> The material set for forming a three-dimensional object according to any one of <1> to <28>,
wherein the solvent is an organic solvent.
<30> The material set for forming a three-dimensional object according to <29>,
wherein the organic solvent is a polar solvent.
<31> A three-dimensional object producing method including:
a layer forming step of forming a layer of a first liquid material for forming a three-dimensional object using the first liquid material for forming a three-dimensional object included in the material set for forming a three-dimensional object according to any one of <1> to <30>; and
a liquid material applying step of applying the second liquid material for forming a three-dimensional object included in the material set for forming a three-dimensional object according to any one of <1> to <30> to a predetermined region of the layer of the first liquid material for forming a three-dimensional object,
wherein the three-dimensional object producing method repeats the layer forming step and the liquid material applying step a plurality of times.
<32> The three-dimensional object producing method according to <31>, further including after the layer forming step
a layer drying step of volatilizing the solvent.
<33> The three-dimensional object producing method according to <31> or <32>, further including after an object is formed
a removing step of removing an unhardened portion of the first liquid material for forming a three-dimensional object by immersion in a liquid.
<34> The three-dimensional object producing method according to any one of <31> to <33>, further including after a three-dimensional object is obtained through repetition of the layer forming step and the liquid material applying step and before the removing step,
a heating step.
<35> The three-dimensional object producing method according to any one of <31> to <34>, further including after an object is formed
a sintering step,
wherein a three-dimensional object after the sintering step satisfies one or more selected from the group consisting of a density of 93% or higher, a bending strength of 1,500 MPa or greater, and a Rockwell hardness of 80 HRA or greater.
<36> The three-dimensional object producing method according to any one of <31> to <35>,
wherein the three-dimensional object producing method produces a dental prosthesis.
<37> A three-dimensional object producing apparatus including:
a liquid material layer supporting unit configured to support a layer of a first liquid material for forming a three-dimensional object;
a layer forming unit configured to form the layer of the first liquid material for forming a three-dimensional object using the first liquid material for forming a three-dimensional object included in the material set for forming a three-dimensional object according to any one of <1> to <30>; and
a liquid material applying unit configured to apply the second liquid material for forming a three-dimensional object included in the material set for forming a three-dimensional object according to any one of <1> to <30> to a predetermined region of the layer of the first liquid material for forming a three-dimensional object.
<38> A dental prosthesis,
wherein the dental prosthesis is produced by the three-dimensional object producing method according to <36>.

The material set for forming a three-dimensional object according to any one of <1> to <30>, the three-dimensional object producing method according to any one of <31> to <36>, the three-dimensional object producing apparatus according to <37>, and the dental prosthesis according to <38> can solve the various problems in the related art and can achieve the object of the present disclosure.

What is claimed is:

1. A material set for forming a three-dimensional object, the material set comprising:
    a first liquid material for forming a three-dimensional object; and
    a second liquid material for forming a three-dimensional object,
    wherein the first liquid material comprises a solvent, an organic compound A, and inorganic particles,
    wherein the second liquid material comprises an organic compound B having reactivity with the organic compound A, and
    wherein the organic compound B comprises at least one selected from the group consisting of Polyethyleneimine, polyallylamine, polyacrylamide, polyvinyl pyrrolidone, and polyurethane.

2. The material set for forming a three-dimensional object according to claim 1, further comprising
    a third liquid material for forming a three-dimensional object,
    wherein the third liquid material dissolves the organic compound A.

3. The material set for forming a three-dimensional object according to claim 1,
    wherein at least any one of the first liquid material for forming a three-dimensional object and the second liquid material for forming a three-dimensional object further comprises a dehydration-condensation agent.

4. The material set for forming a three-dimensional object according to claim 1,
    wherein the organic compound A comprises an acidic functional group, and
    wherein the organic compound B comprises a basic functional group.

5. The material set for forming a three-dimensional object according to claim 4,
    wherein the acidic functional group comprises a carboxyl group, and
    wherein the basic functional group comprises an amino group or an amide group.

6. The material set for forming a three-dimensional object according to claim 1,
    wherein an amine value of the second liquid material for forming a three-dimensional object is 100 mgKOH/g or greater.

7. The material set for forming a three-dimensional object according to claim 1,
    wherein the organic compound A comprises a polyacrylic acid.

8. The material set for forming a three-dimensional object according to claim 1,
    wherein an amine value of the organic compound B is 300 mgKOH/g or greater but 1,500 mgKOH/g or less.

9. The material set for forming a three-dimensional object according to claim 1,
    wherein the organic compound B comprises at least any one selected from the group consisting of polyethyleneimine and polyallylamine.

10. The material set for forming a three-dimensional object according to claim 1,
    wherein the inorganic particles comprise at least one selected from the group consisting of ceramic particles and metal particles.

11. The material set for forming a three-dimensional object according to claim 1,
    wherein the inorganic particles have bio-compatibility.

12. The material set for forming a three-dimensional object according to claim 10,
    wherein a volume average particle diameter of the ceramic particles in the first liquid material for forming a three-dimensional object is less than 5 micrometers.

13. The material set for forming a three-dimensional object according to claim 10,
    wherein a volume average particle diameter of the metal particles in the first liquid material for forming a three-dimensional object is less than 50 micrometers.

14. The material set for forming a three-dimensional object according to claim 1, wherein a content of the inorganic particles is 20 parts by mass or greater but 70 parts by mass or less relative to 100 parts by mass of the first liquid material for forming a three-dimensional object.

15. The material set for forming a three-dimensional object according to claim 2, wherein the third liquid material for forming a three-dimensional object comprises a substance that forms a salt with the organic compound A.

16. A three-dimensional object producing method comprising:
    forming a layer of a first liquid material for forming a three-dimensional object using a first liquid material for forming a three-dimensional object; and
    applying a second liquid material for forming a three-dimensional object to a predetermined region of the layer of the first liquid material for forming a three-dimensional object,
    wherein the three-dimensional object producing method repeats the forming and the applying a plurality of times,
    wherein the first liquid material used in the forming is included in a material set for forming a three-dimensional object, wherein the material set comprises:
        the first liquid material for forming a three-dimensional object, wherein the first liquid material comprises a solvent, an organic compound A, and inorganic particles; and
        the second liquid material for forming a three-dimensional object, wherein the second liquid material comprises an organic compound B having reactivity with the organic compound A, and
    wherein the second liquid material applied in the applying is included in a material set for forming a three-dimensional object, wherein the material set comprises:
        the first liquid material for forming a three-dimensional object, wherein the first liquid material comprises a solvent, an organic compound A, and inorganic particles; and
        the second liquid material for forming a three-dimensional object, wherein the second liquid material comprises an organic compound B having reactivity with the organic compound A, wherein the organic compound B comprises at least one selected from the group consisting of polyethyleneimine, polyallylamine, polyacrylamide, polyvinyl pryrolidone, and polyurethane.

17. The three-dimensional object producing method according to claim 16,
further comprising after the forming
drying the layer to volatilize the solvent.

18. The three-dimensional object producing method according to claim 16,
further comprising after an object is formed
removing an unhardened portion of the first liquid material for forming a three-dimensional object by immersion in a liquid.

19. A three-dimensional object producing apparatus comprising:
a liquid material layer supporting unit configured to support a layer of a first liquid material for forming a three-dimensional object;
a layer forming unit configured to form the layer of the first liquid material for forming a three-dimensional object using a first liquid material for forming a three-dimensional object; and
a liquid material applying unit configured to apply a second liquid material for forming a three-dimensional object to a predetermined region of the layer of the first liquid material for forming a three-dimensional object,
wherein the first liquid material used by the layer forming unit is included in a material set for forming a three-dimensional object, wherein the material set comprises:
the first liquid material for forming a three-dimensional object, wherein the first liquid material comprises a solvent, an organic compound A, and inorganic particles; and
the second liquid material for forming a three-dimensional object, wherein the second liquid material comprises an organic compound B having reactivity with the organic compound A, and
wherein the second liquid material applied by the liquid material applying unit is included in a material set for forming a three-dimensional object, wherein the material set comprises:
the first liquid material for forming a three-dimensional object, wherein the first liquid material comprises a solvent, an organic compound A, and inorganic particles; and
the second liquid material for forming a three-dimensional object, wherein the second liquid material comprises an organic compound B having reactivity with the organic compound A, wherein the organic compound B comprises at least one selected from the group consisting of polyethyleneimine, polyallylamine, polyacrylamide, polyvinyl pryrolidone, and polyurethane.

* * * * *